(12) United States Patent
Irwin

(10) Patent No.: US 11,172,621 B2
(45) Date of Patent: Nov. 16, 2021

(54) MODULAR VERTICAL AGRICULTURE ASSEMBLY TO SUPPORT VEGETATIVE GROWTH IN THE VERTICAL PLANE

(71) Applicant: George Addison Irwin, Rochester, NY (US)

(72) Inventor: George Addison Irwin, Rochester, NY (US)

(*) Notice: Subject to any disclaimer, the term of this patent is extended or adjusted under 35 U.S.C. 154(b) by 107 days.

(21) Appl. No.: 15/918,119

(22) Filed: Mar. 12, 2018

(65) Prior Publication Data

US 2018/0263192 A1  Sep. 20, 2018

Related U.S. Application Data

(60) Provisional application No. 62/471,805, filed on Mar. 15, 2017.

(51) Int. Cl.
*A01G 9/02* (2018.01)
*A01G 25/16* (2006.01)
*A01G 27/00* (2006.01)

(52) U.S. Cl.
CPC ........... *A01G 9/022* (2013.01); *A01G 25/167* (2013.01); *A01G 27/00* (2013.01)

(58) Field of Classification Search
CPC ........ A01G 9/022; A01G 9/023; A01G 9/024; A01G 27/005; A01G 31/06
See application file for complete search history.

(56) References Cited

U.S. PATENT DOCUMENTS

| | | | |
|---|---|---|---|
| 7,716,873 B2 | 5/2010 | Irwin | |
| 7,814,703 B2 | 10/2010 | Irwin | |
| 7,921,599 B2 * | 4/2011 | Irwin | A01G 9/025 47/66.1 |
| 8,950,112 B2 * | 2/2015 | dos Santos | A01G 27/005 47/82 |
| 8,984,808 B2 * | 3/2015 | Daniels | A01G 9/025 47/82 |
| 9,004,298 B2 * | 4/2015 | Sichello | A01G 9/025 211/126.2 |
| 9,210,846 B2 * | 12/2015 | VanLente | A01G 9/022 |
| 10,051,795 B2 * | 8/2018 | Wu | A01G 9/024 |
| 10,485,185 B1 * | 11/2019 | Di Prima-Bucci | A01G 9/025 |
| 2009/0223126 A1 * | 9/2009 | Garner | E04F 13/081 47/66.7 |
| 2011/0258925 A1 * | 10/2011 | Baker | A01G 9/023 47/65.8 |
| 2013/0340337 A1 * | 12/2013 | Kuo | A01G 9/023 47/82 |
| 2014/0109473 A1 * | 4/2014 | Sung | A01G 9/022 47/39 |
| 2014/0230325 A1 * | 8/2014 | Collis | A01G 9/022 47/82 |
| 2015/0230412 A1 * | 8/2015 | Ito | A01G 9/025 47/66.7 |
| 2016/0050856 A1 * | 2/2016 | Shah | A01G 9/025 47/66.1 |
| 2016/0360712 A1 | 12/2016 | Yorio et al. | |

FOREIGN PATENT DOCUMENTS

FR  2763488 A1 * 11/1998 ............. A01G 9/023

* cited by examiner

*Primary Examiner* — Magdalena Topolski
*Assistant Examiner* — Katelyn T Truong

(57) ABSTRACT

A modular assembly is disclosed to support, feed, and water live vegetative growth on an inclined or vertical surface, using a series of horizontally mounted troughs affixed to an impervious backing panel.

6 Claims, 23 Drawing Sheets

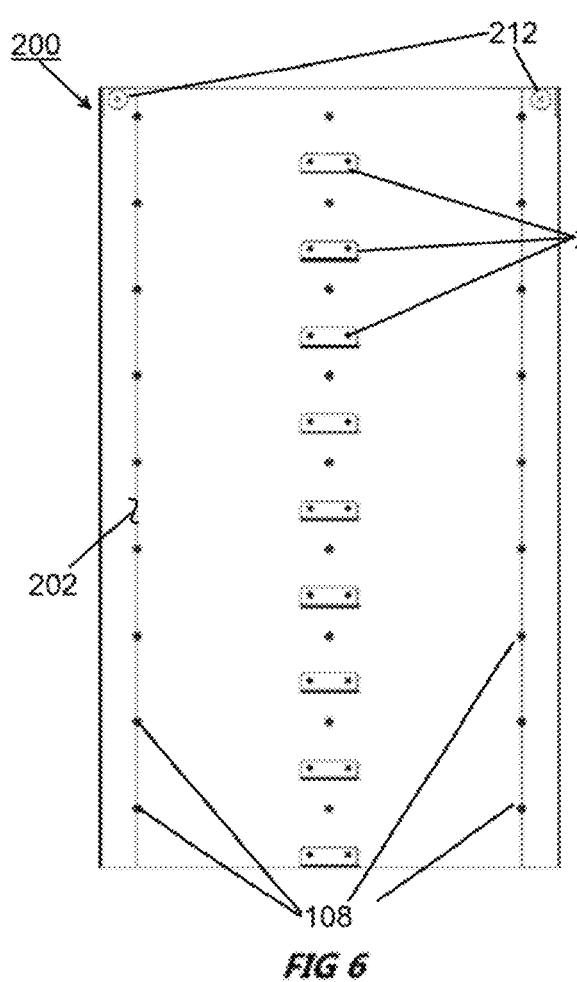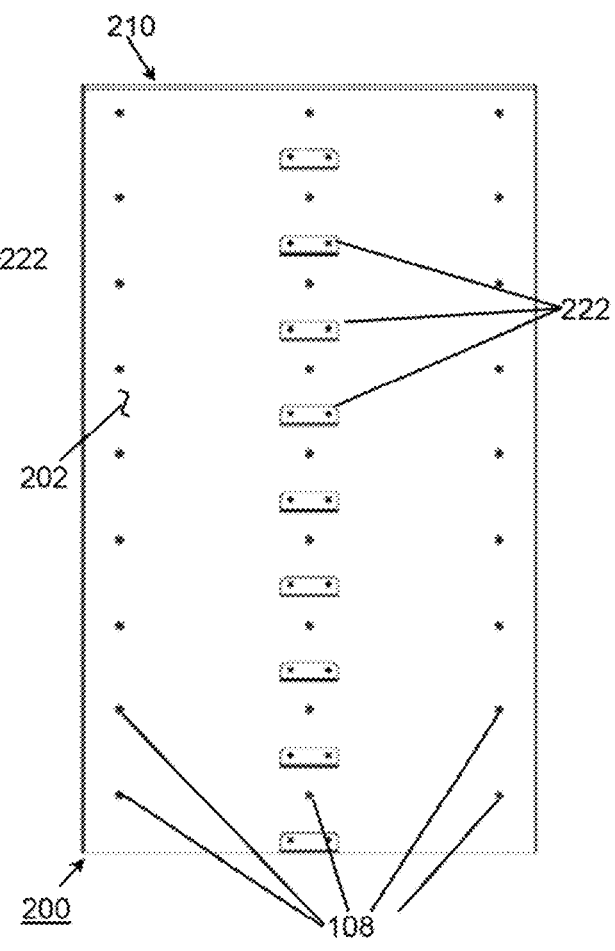

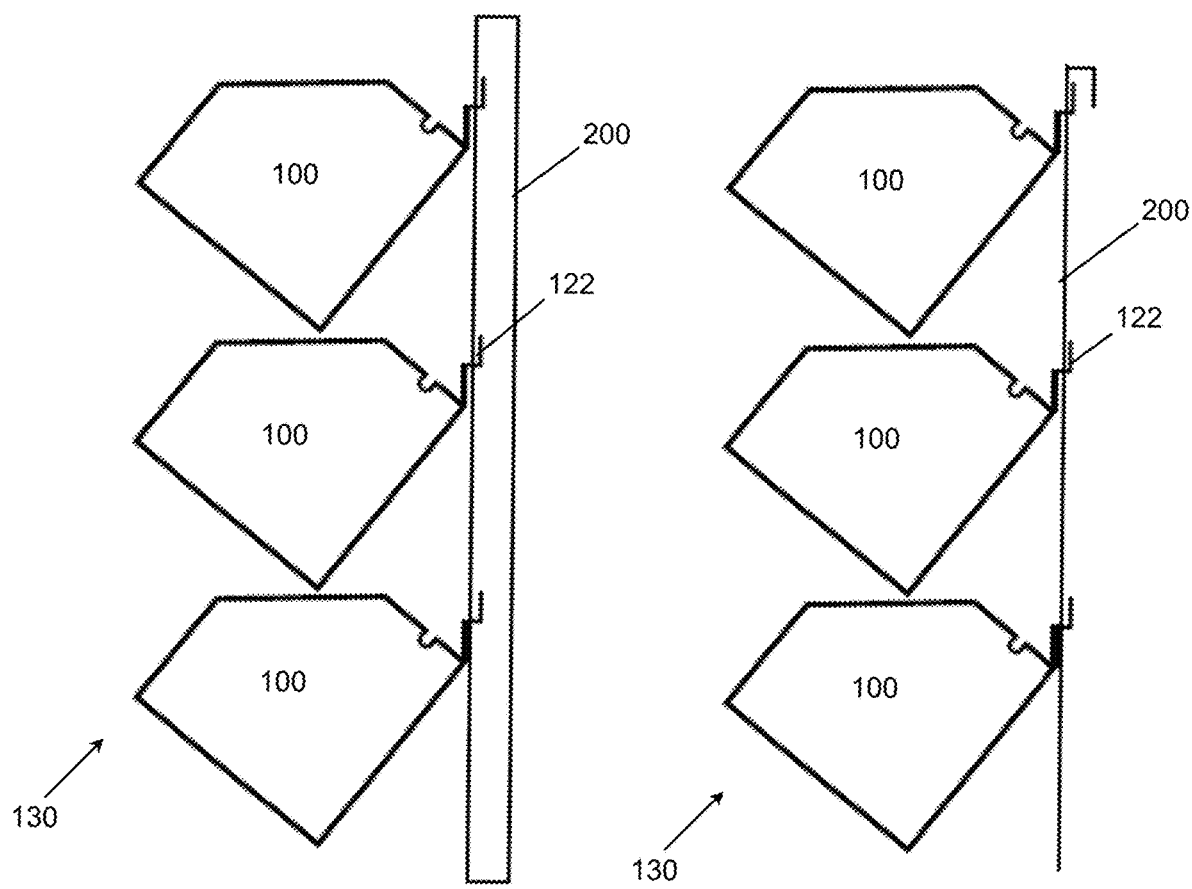

MODULAR VERTICAL AGRICULTURE ASSEMBLY TO SUPPORT VEGETATIVE GROWTH IN THE VERTICAL PLANE

This application claims priority under 35 U.S.C. § 119(e) from U.S. Provisional Patent Application No. 62/471,805, for a MODULAR VERTICAL AGRICULTURE ASSEMBLY TO SUPPORT VEGETATIVE GROWTH IN THE VERTICAL PLANE, filed Mar. 15, 2017 by George A. Irwin, which is hereby incorporated by reference in its entirety.

A modular assembly to support vegetative growth on a vertical surface, using a series of horizontally mounted troughs affixed to an impervious backing panel, creates a system for supporting live vegetation growth in an inclined or vertical orientation, and more particularly the system provides an open face, inclined or vertically oriented assembly for retaining and sustaining vegetation for agricultural, medical or decorative vegetation, including vertical farming, agriculture propagation, plant walls, living walls, green walls and vertical gardens.

BACKGROUND AND SUMMARY

Food Security is a growing global concern that will affect everyone, and proposes to be one of the most significant problems facing humanity. If not resolved, the world's future social order will be at stake. The world population is projected to rise from a current level of approximately 7 billion to 9 billion by 2050. Food production must increase by 70% to 90% to meet the demand as climate change could reduce current yields by 5% to 25%.

Current agricultural practices and greenhouse applications to grow plants are traditionally conducted in a horizontal orientation. The space requirements and horizontal orientation define and limit the number of plants that can be grown within a particular area with no means to increase the surface area to plant ratio.

In recent years the development of indoor farming has led to a spike in vertical farms. These farms typically include a series of horizontal shelves stacked on top of one another to form a rack. The rack can be as high as the ceiling height and as secure as the framework will allow. Noted in U.S. patent application No. 2016/0360712 is an attempt to create density and increased production by stacking shelves.

These vertical farms have their challenges. The stacking of shelving units result in incorrect ergonomics, for example, forcing the user to inconsistently reach, twist or bend inside and through the stacked shelving units. In general these shelving units are fixed and are cumbersome to access in order to plant, harvest and maintain the agricultural system. Where horizontal methods have been adopted by modern vertical farms using stacked trays for indoor agriculture and plants, the yield suffers from numerous disadvantages. As another example, the grower using hydroponic techniques is limited because of the confined height restrictions between the horizontal rows of space. The plant can grow as big as the limiting height of the shelf above allows. This same configuration of using stacked shelves also increases the equipment requirements, specifically the increased number of lights required to grow the plants. Typically a few lights for each row also increases energy use and an increase in heating air and humidity, thereby making it even more difficult to ensure air circulation in an otherwise tight, dense configuration.

Therefore, the need exists for a vertical growing system that is suitable to retain and support indoor crops, whether they be medical crops or other vegetation, while reducing the required foot print. The need also exists for a vegetative support system that efficiently sustains a relatively large vegetative growth, while reducing and minimizing maintenance, water requirements, energy use, etc. and provides an ergonomically correct working position so as to reduce or prevent work related injuries.

Disclosed in embodiments herein is an assembly for supporting vegetative growth in a generally vertical orientation, comprising: (a) at least one impervious backplane; and (b) an array of generally parallel troughs attached to the at least one impervious backplane, each of said troughs suitable for supporting vegetation growth of a plurality of plants disposed therein.

Further disclosed in embodiments herein is vertical farming system, including: (a) a plurality of panels for supporting vegetative growth in a generally vertical orientation, each of said panels comprising: (i) at least one backplane having a generally fluid-impervious front surface; (ii) an array of generally parallel troughs attached to the at least one backplane, wherein each of said parallel troughs includes an adjoining bottom and back wall, and a pair of side walls, each side extending from an end of the back wall along the end of the bottom, a front wall spanning between the sides along a longitudinal edge of the bottom, and at least one angled tab extending from a longitudinal edge of the back wall, each of said troughs suitable for supporting the vegetative growth of a plurality of plants disposed therein, wherein the plurality of plants are each disposed in a pot, said pot being maintained in contact with at least one surface of one of said parallel troughs; and (b) a source of irrigation liquid operatively associated with at least an uppermost trough on an uppermost panel, wherein each of said troughs includes at least one aperture in a wall to limit a level of liquid accumulated within said trough.

BRIEF DESCRIPTION OF THE DRAWINGS

FIGS. 6-7 are forward views of the trough backplane;

FIGS. 33-38 are various views of a step formed along the trough to be hooked into a slot within the backplane.

Figure 1:
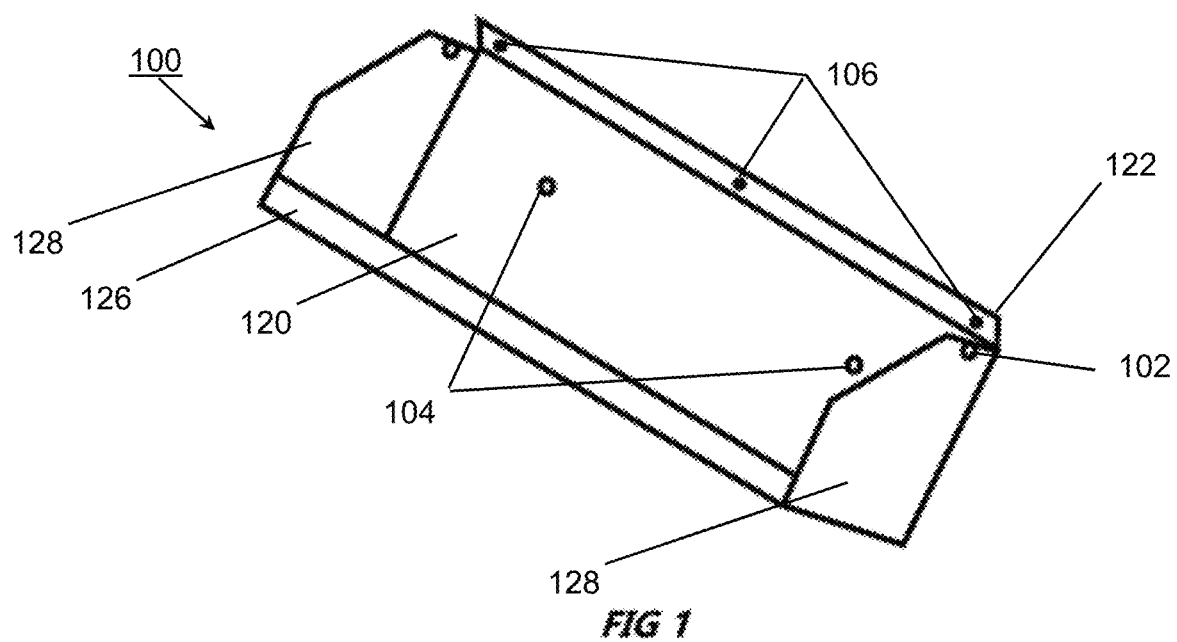
FIG. 1 a perspective view of a trough in accordance with a disclosed embodiment.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Figure 2:
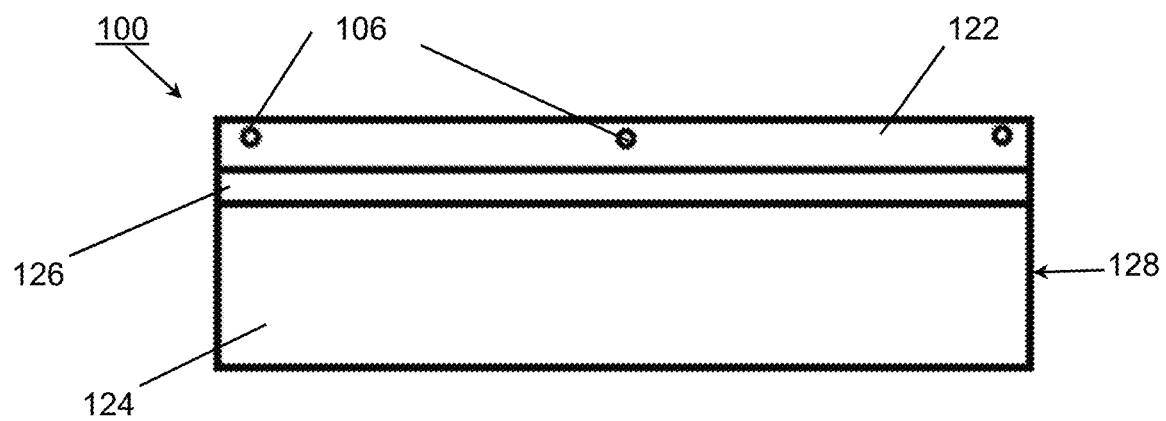
FIG. 2 is a frontal planar view of a trough.
Figure 3:
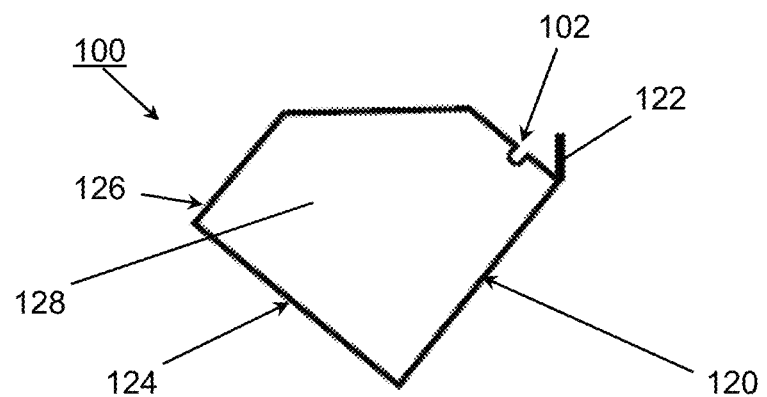
FIG. 3 is a side view of a trough.
Figure 4:
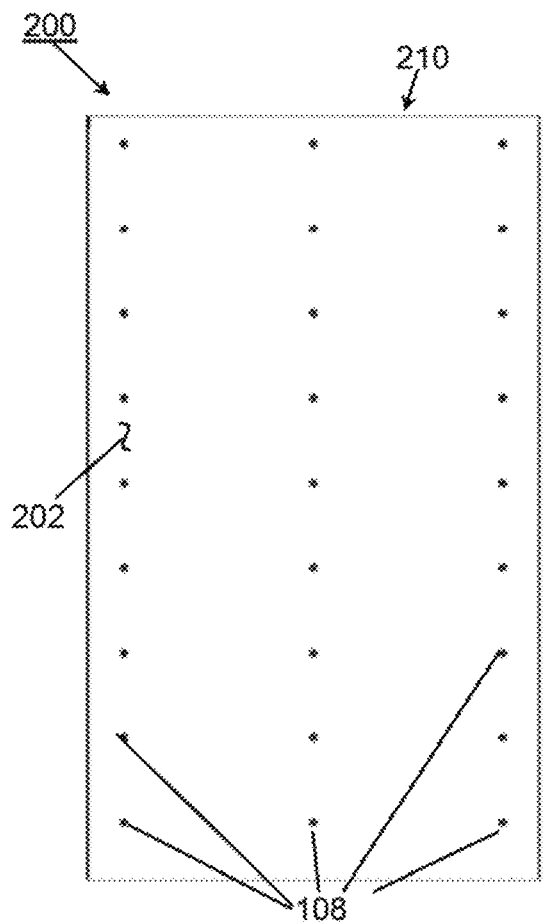
FIGS. 4-5 are rear views of the trough backplane.
Figure 5:
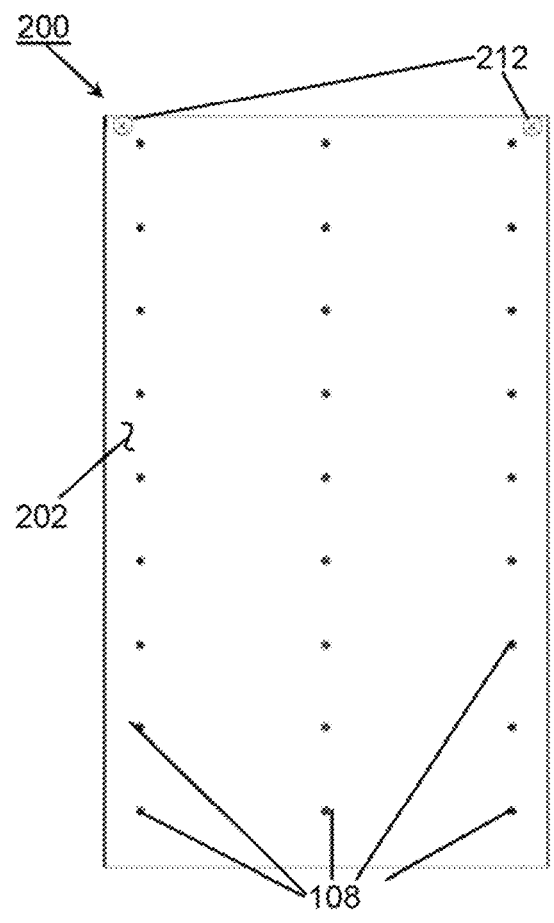

Referring to the figures, various components and alternatives will now be described in a general sense and then further discussed in relation to particular embodiments. FIGS. 1-3, respectively, present a perspective view, a front view, and a side view of a trough 100, which forms part of a modular vertical agriculture assembly (e.g., FIG. 12) disclosed herein to support vegetative growth in the vertical plane. FIGS. 4-5 present rear views of alternative panels or backplanes 200, to which troughs 100 may be attached.

Trough 100 is formed with a back wall 120 having a lip or tab 122 extending at an angle (~5°-60°) therefrom. The trough also has a bottom 124 extending between the back wall, and a front wall 126, where the front wall and back wall are generally parallel to one another. In the embodiments depicted the front wall is only a partial-height wall, and the height may be dependent upon the vegetative growth for which the trough is designed. The trough also has side walls 128 at each of its ends. The bottom of the trough is made watertight, either by bending and or sealing (e.g., welding) the respective surfaces of the back, bottom, front and side walls. The dimensions of the trough may be made so as to fit a particular application (e.g., plant potting size), and the height of the front wall may, as noted above, be customized to accommodate the intended orientation or angle for the vegetative crop to be grown in the trough. Each trough may further include mounting holes 106 spaced along the tab 122, with which the trough may be attached to a backplane 200. As will be discussed below, troughs 100 may further include one or more apertures 104, designed to control the level of water or other liquids and fluids within the trough. And, side walls 128 may also include a notch or aperture 102 through which a liquid may pass to assure that any overflow from a trough occurs along a side of the trough, and that excess liquid does not accumulate in the trough if the apertures 104 become covered.

Figure 8:
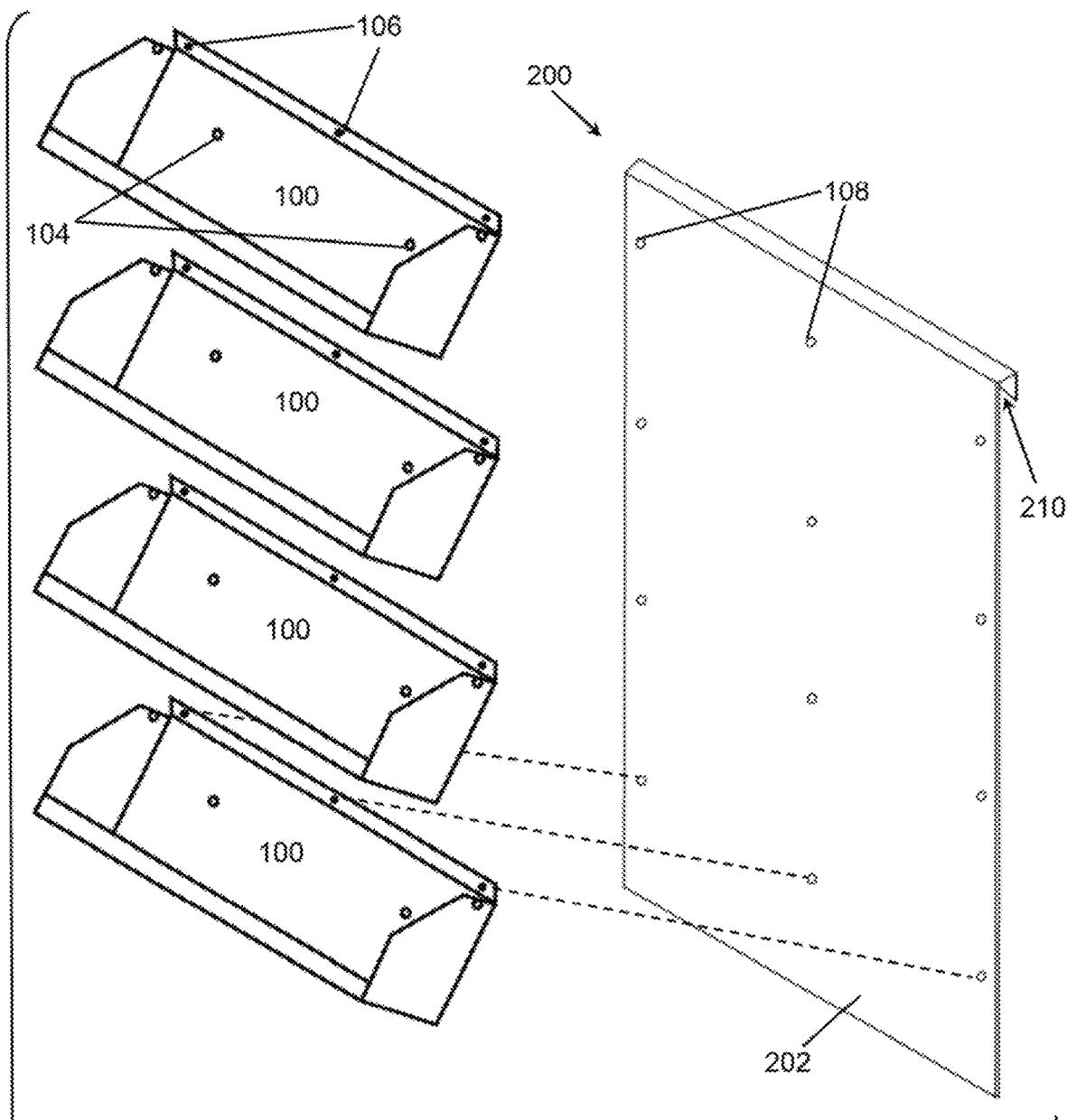
FIGS. 8-9 is an exploded view of quad troughs and the backplane.

Referring to FIG. 4, and FIG. 8, depicted therein is a backplane 200 including a U-shaped flange along the top to form hook 210. The hook, located along the uppermost part of the backplane, enables the backplane to be hung on a bracket (e.g., 350 of FIG. 12, framework 266 of rack 260 in FIG. 26), or similar structure that the hook can engage, so that the backplane 200 is hung on the bracket or similar structure to become part of the modular vertical agriculture assembly. FIG. 5 provides a rear view of the backplane 200, with apertures 212 located at the upper most part of the impermeable wall for a direct mounting option where the backplane is mounted on a vertical wall or similar surface as part modular vertical agriculture assembly. Each of the backplanes in FIGS. 4-5 include a plurality of regularly spaced holes 108 that match up with mounting holes 106 in the troughs 100 to allow a fastener to attach the troughs to the backplane.

Turning to FIG. 6, depicted therein is a front view of the backplane, with apertures 212 located at the upper most part of the backplane for the direct or surface-mounting option to accept mounting hardware such as screws, lag bolts and the like, which are part of the modular vertical agriculture assembly. FIG. 7 is a front view of the backplane 200, with a hook 210 located at the upper most part of the backplane, for mounting to a bracket or similar horizontal support system as part of the modular vertical agriculture assembly. FIGS. 6 and 7 also illustrate the use of spacers or supports 222 that may be attached to the face of a backplane in order to hold the back wall 120 of a trough 100 away from the front surface 202 of the backplane 200. The supports 222 assure that the bottom of the trough is maintained at an angle. Holding the trough at an angle also assures that liquid passing through apertures 104 runs down the back of the trough and drips from the lower edge of the upper trough into a trough below, and does not just run down the front surface of the backplane.

FIG. 8 presents a perspective assembly view of the troughs 100 and backplane 200 in an exemplary embodiment of the assembly for supporting vegetative growth prior to affixing the troughs to the backplane. The backplane 200 is of a configuration as described relative to FIG. 4, and is shown with the inverted U-shaped hook 210 located at the upper most part of the backplane, for mounting to a bracket or similar support system. The size of the backplane may be suitable to cover a large vertical span such as a conventional interior wall, or a space that could be easily reached by a worker without the aid of a stool or ladder.

Figure 9:
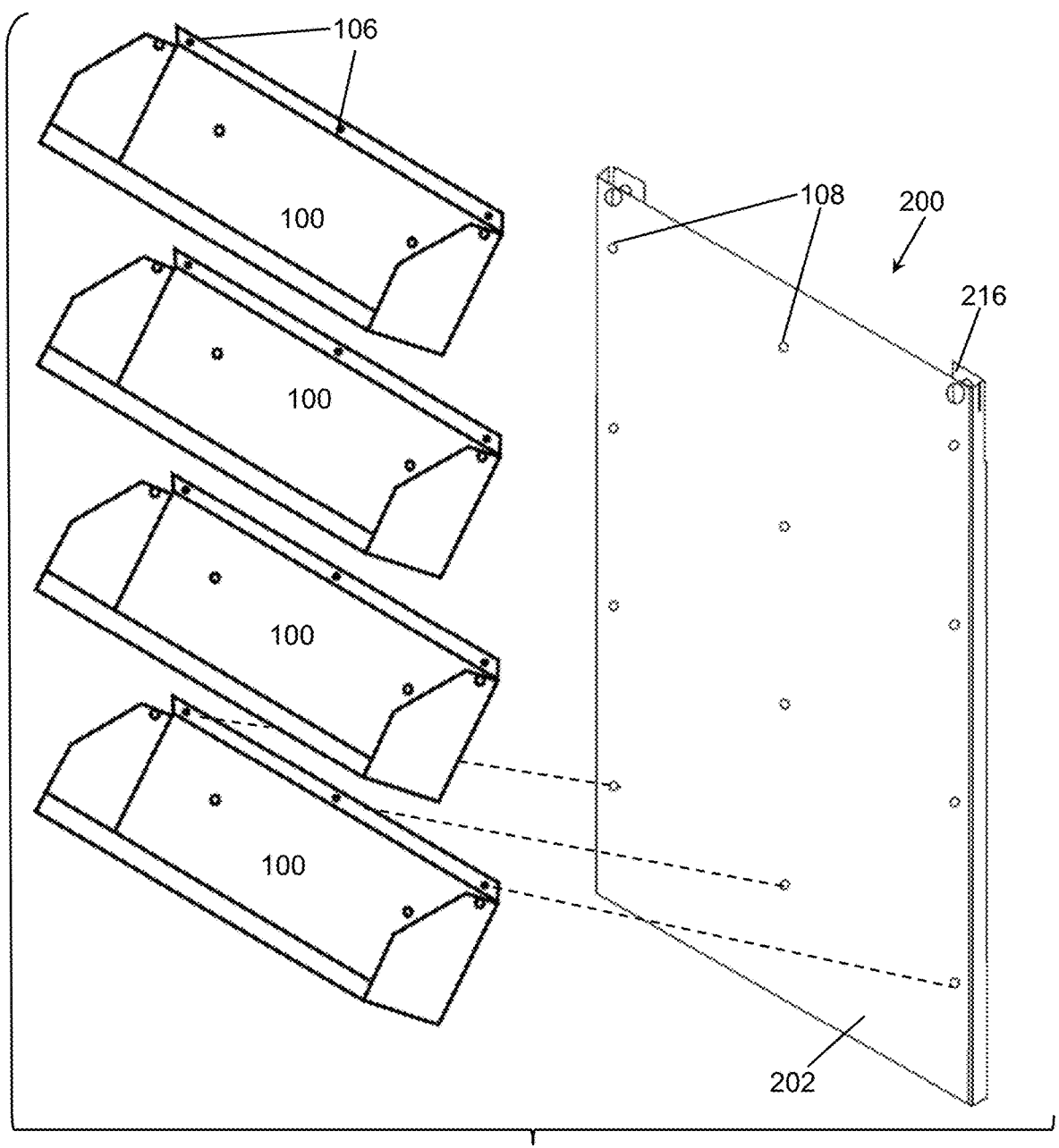

Similarly, FIG. 9 presents the alternative backplane configuration with apertures located at the uppermost part to accept hardware for mounting the backplane directly to a vertical or near-vertical surface. As the assembly lines in FIGS. 8 and 9 illustrate, holes 106 in the troughs 100 align with holes 108 in the backplanes 200, permitting the attachment of the troughs to the backplane with the use of fasteners such as a rivet, screw, etc. Furthermore, one or more of water-impermeable fasteners, gaskets, sealants and the like may be employed in the attachment of the troughs to a backplane in order to maintain an impermeable front surface of the backplane so that liquid does not easily penetrate to or collect on the rear surface of the backplane.

Figure 10:
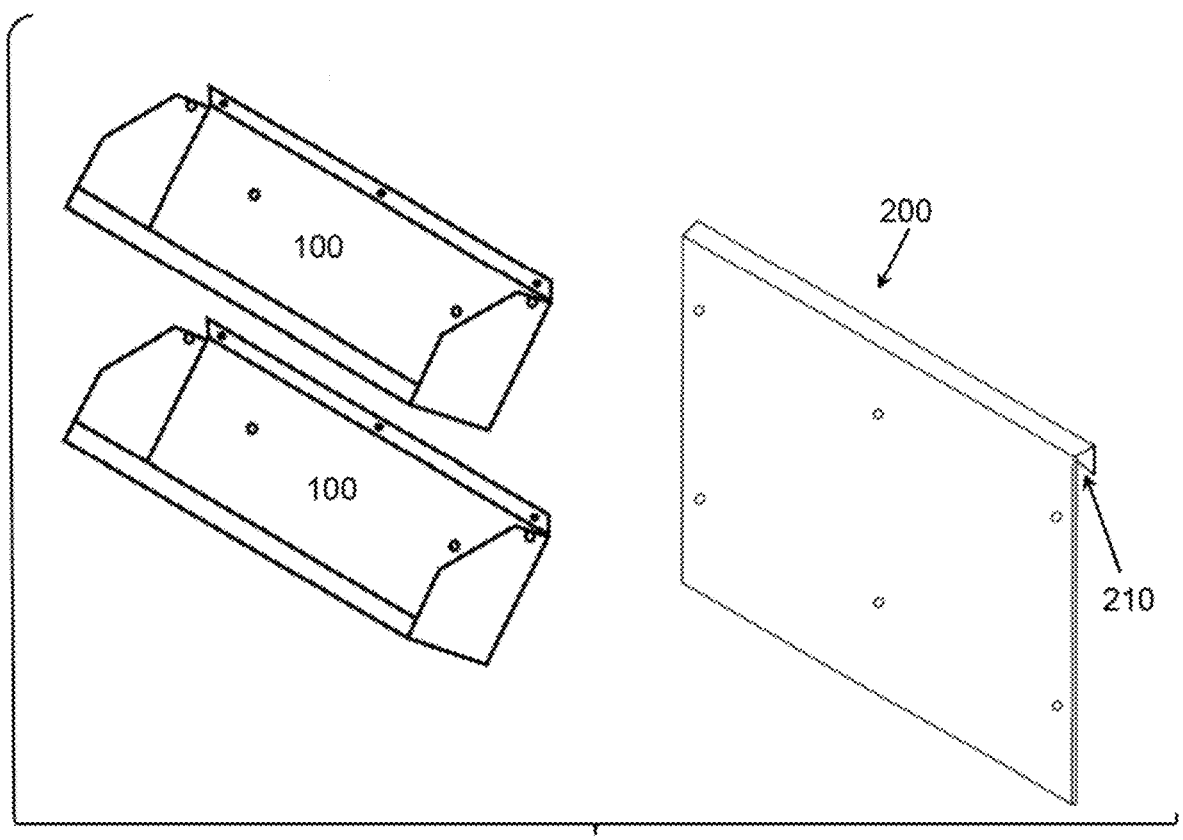
FIGS. 10-11 is an exploded view of dual troughs and the backplane.
Figure 11:
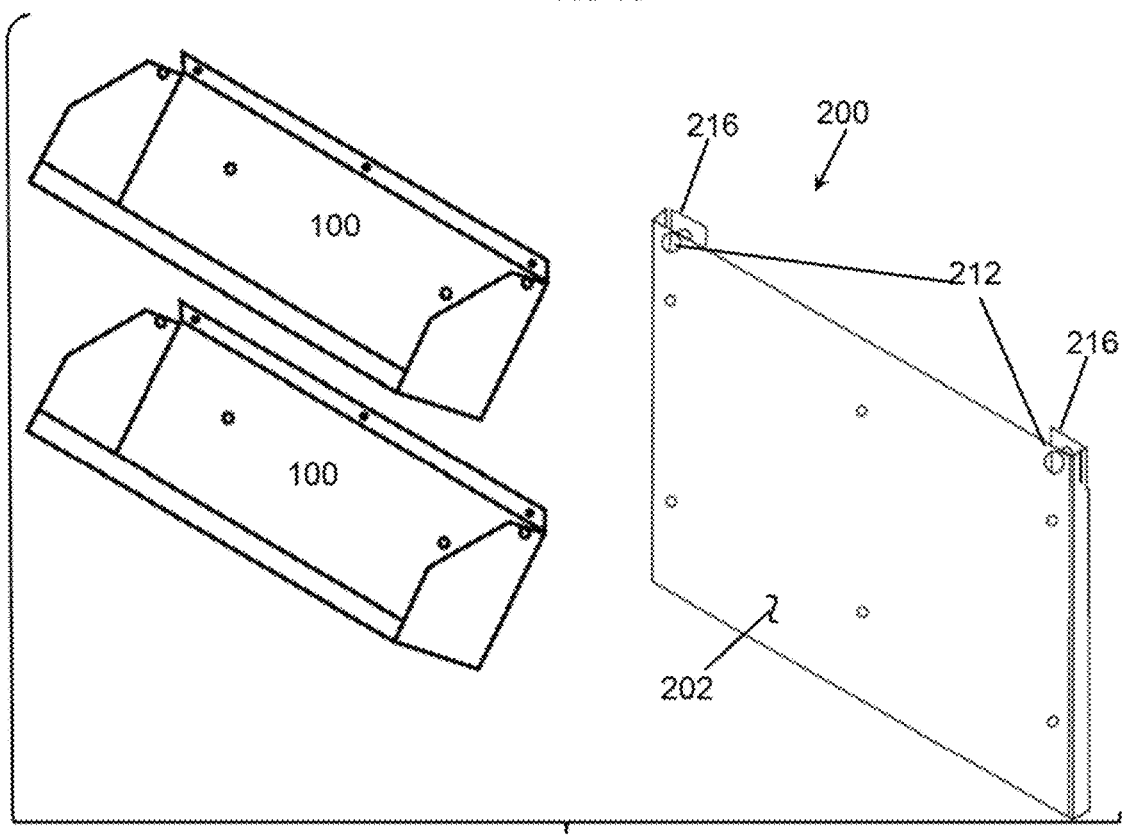

Referring next to FIGS. 10-11, depicted therein are perspective views of the troughs 100 for assembly to a backplane 200, albeit prior to affixing the troughs. In FIG. 10 backplane 200 is shown is a smaller, panel size, with a continuous hook 210 located along the backplane at the top for mounting (hanging on) a bracket system or structure such as a rack. This perspective view demonstrates multiple troughs which increase or decrease the height of the panel assembly. The troughs' horizontal length is also dictated by the size and number of potted plants or other agricultural product being supported in the troughs. As with prior embodiments, FIG. 11 is a perspective view of the troughs 100 and backplane 200, where the backplane panel includes apertures 212 located in the uppermost corners of backplane 200 to accept pending hardware for mounting directly to a vertical or semi vertical surface. This perspective view illustrates multiple troughs which increase or decrease the height of the panel assembly. The troughs' horizontal length is also dictated by the size and number of potted plants.

As further illustrated in the backplane panel embodiment of FIG. 11, the backplane 200 provides apertures 122 in the front surface 202, and the apertures 212 provide access to smaller holes in the flange 216 that extends or wraps around behind the backplane panel. In one contemplated installation embodiment backplane panel 200 is intended to attach to a vertical structure by conventional fasteners that hold flange 216 to the vertical structure or wall. The backplane panel may further include a keyhole slot in flange 216 to facilitate easy installation and removal of the backplane panel. When conventional fasteners are used with the panel assembly of FIG. 11, the keyhole slot is provided to facilitate the panel being inserted over and onto a protruding head of a fastener (e.g., FIGS. 13 and 15).

Figure 12:
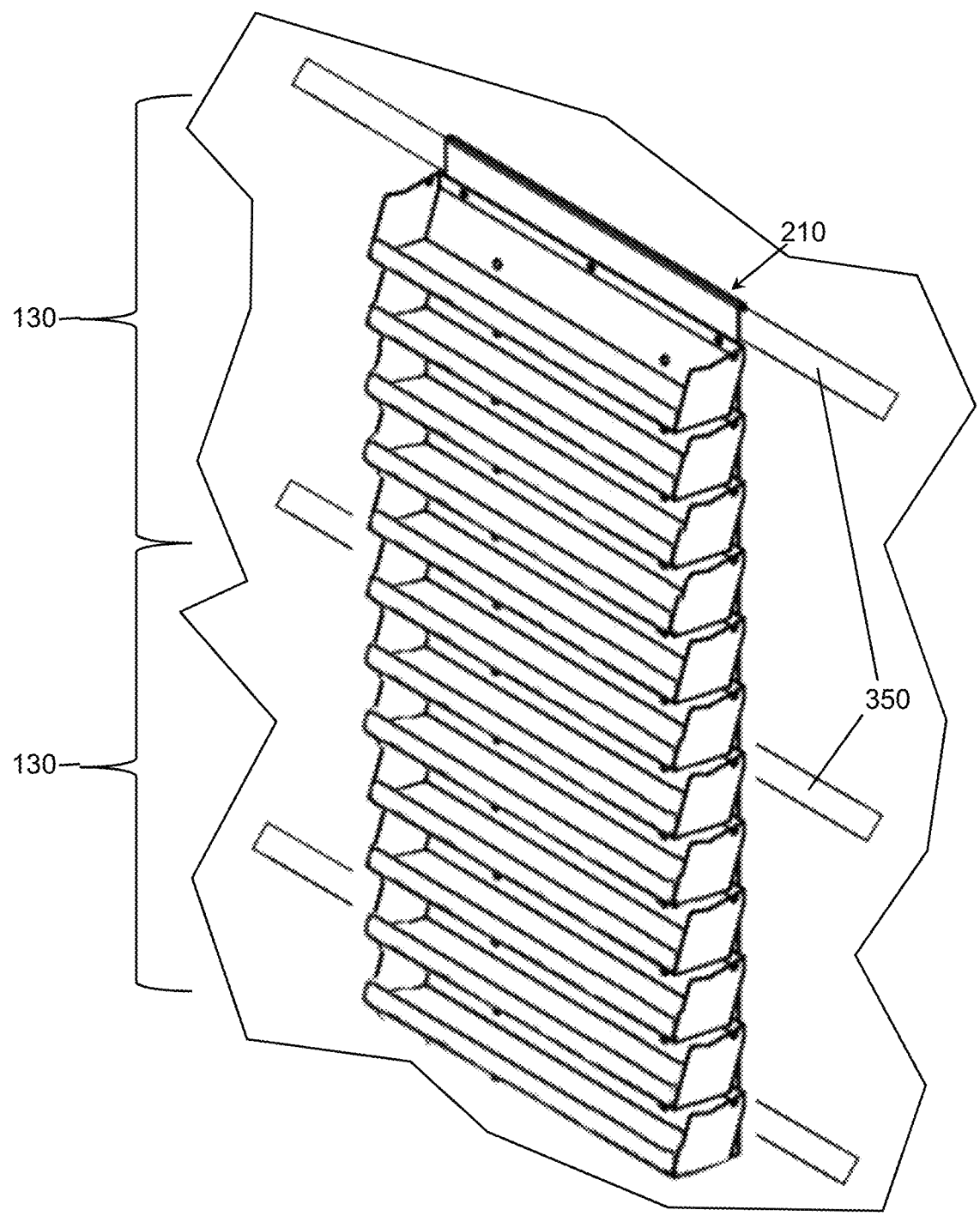
FIG. 12 is a perspective view of a multi-trough/backplane assembly.
Figure 13:
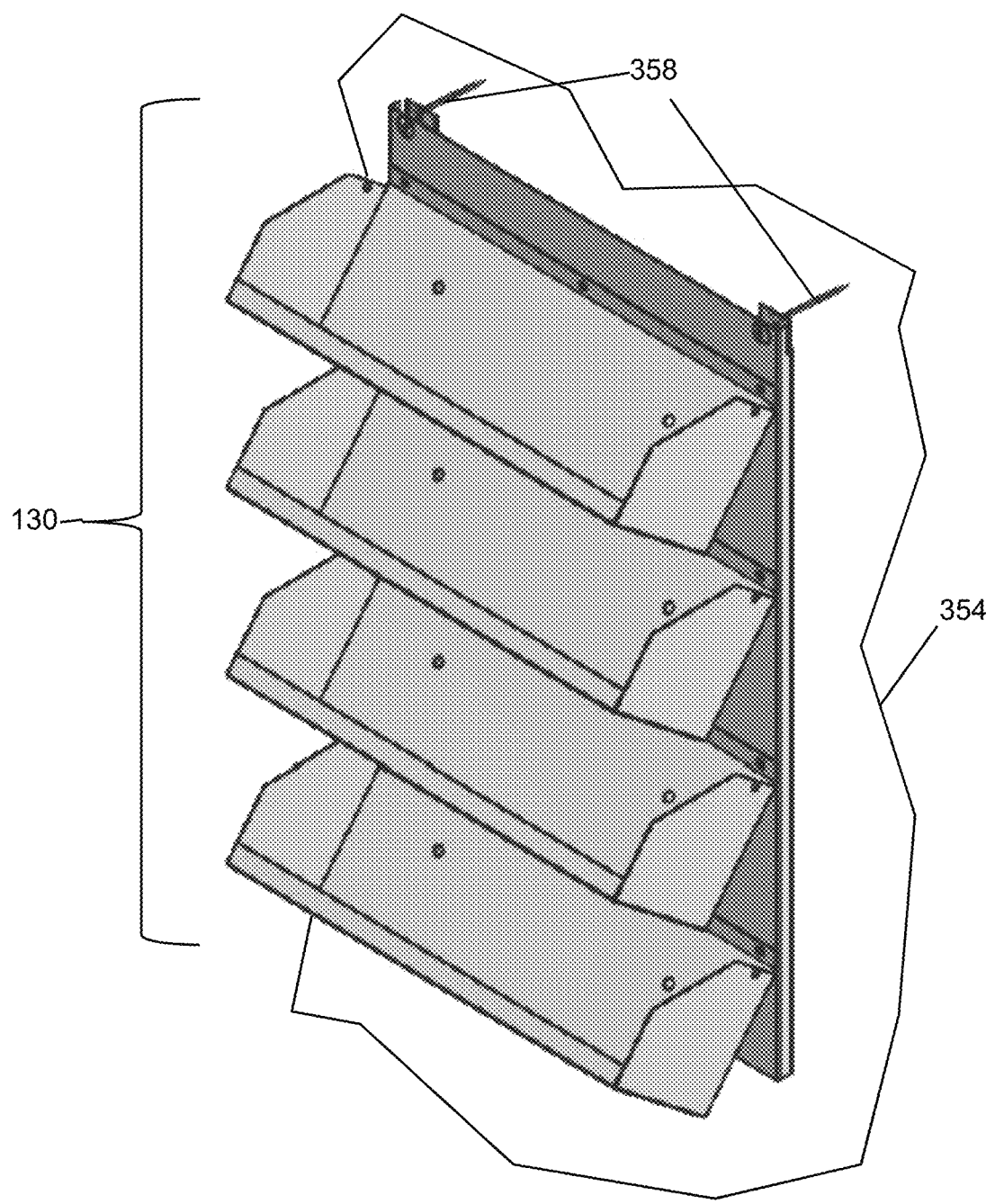
FIG. 13 is a perspective view of the backplane mounting hardware.
Figure 14:
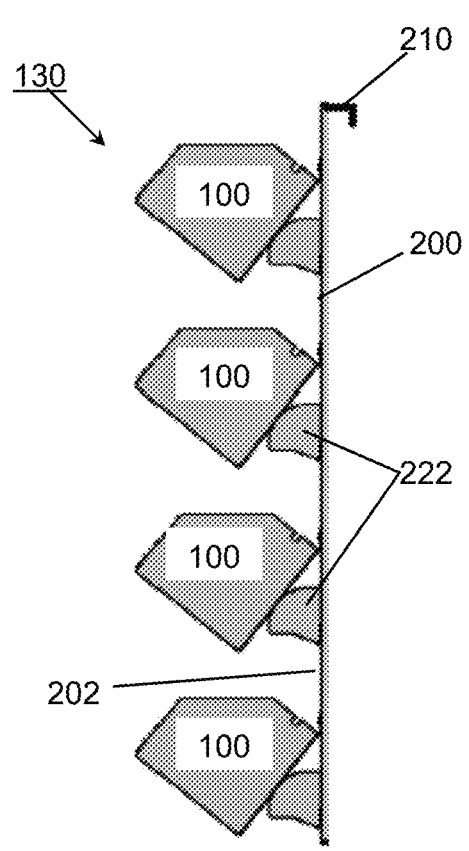
FIG. 14-15 is right side view of quad troughs backplane mounting features.

Examples of assembled panels, with troughs 100 attached to backplanes 200, are illustrated in FIGS. 12-15. FIGS. 12 and 14 provide views of multiple affixed troughs to form a panel assembly or panel(s) 130. The panels 130 of FIGS. 12 and 14 employ the hook 210 for mounting to a bracket 350 or similar support system. This perspective view demonstrates multiple troughs which increase or decrease the height of each panel assembly. The horizontal length of the troughs may also be dictated by the size and number of potted plants. As with FIGS. 12 and 14, FIGS. 13 and 15 illustrate views of panel assembly 130, albeit with multiple troughs affixed to the direct wall-mount type of backplane. As previously described the panel assembly depicted can be affixed to a vertical wall section 354 using fasteners such as lag bolts 358. Similar to FIGS. 12-15, FIGS. 16 and 17 are respective front views of panel assemblies 130, for the hook top and direct, wall-mount panel embodiments, each with multiple troughs 100 affixed to backplane 200.

Figure 18:
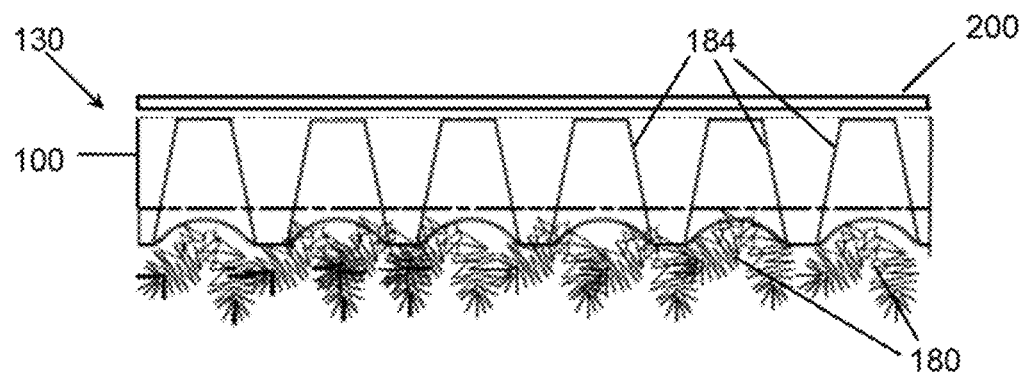
FIGS. 18-19 is a top down view of vertically positioned potted plants.
Figure 19:
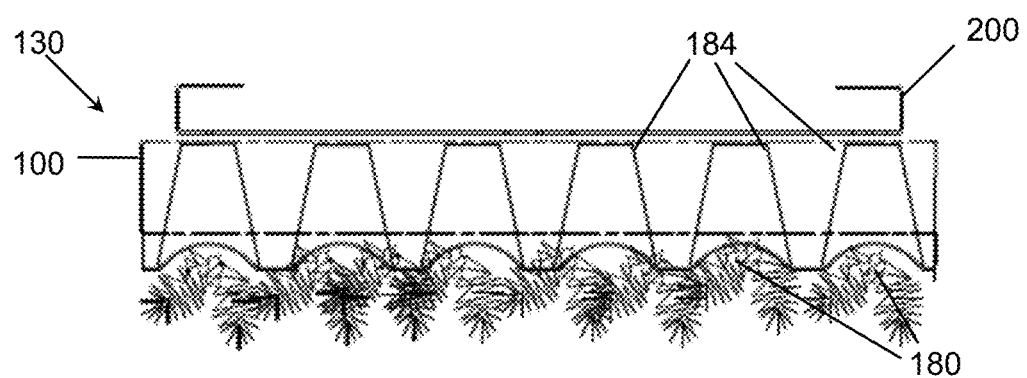

Turning next to FIG. 18, depicted therein is a top view of an agricultural assembly including a panel 130 employing a hook for mounting to a bracket system. This view illustrates the placement of plants 180, in pots 184 or the like, and arranged along the trough—where the trough's dimensions, such as horizontal length, may be customized to fit the size and number of potted plants to be maintained in the trough. Like FIG. 18, FIG. 19 is a top view of a wall-mount panel with potted plants.

FIGS. 20-25 illustrate various embodiments and alternative assemblies for supporting vegetative growth in a generally vertical orientation. In particular, the figures illustrate liquid transfer from the upper trough through and into the lower troughs via the apertures 104 (see e.g., FIG. 1) located in the rear wall of each of the troughs 100. Each trough 100 has a calculated reservoir for water based upon the size of the trough and is designed to accommodate one or a range of plant sizes as represented by the number and/or size of the potted plant (or the pot itself). Once the irrigation liquid level reaches the level of apertures 104 in the trough, excess irrigation fluid or liquid 226 drips out through the aperture 104, flows down the exterior of back wall 120 of the trough and then drips into the trough below and so on, until the panel assembly reaches full saturation. Full saturation is indicated by the lowermost trough dripping through the apertures 104 into a catch basin or similar sump-type receptacle. As represented by the side view of FIG. 21, interlocking panel assemblies 130 may be placed in series oved a vertical span, and the process of irrigation as described with a single panel will similarly operate for liquid transfer from one panel assembly 132 to another panel assembly 134.

Figures 22, 23:
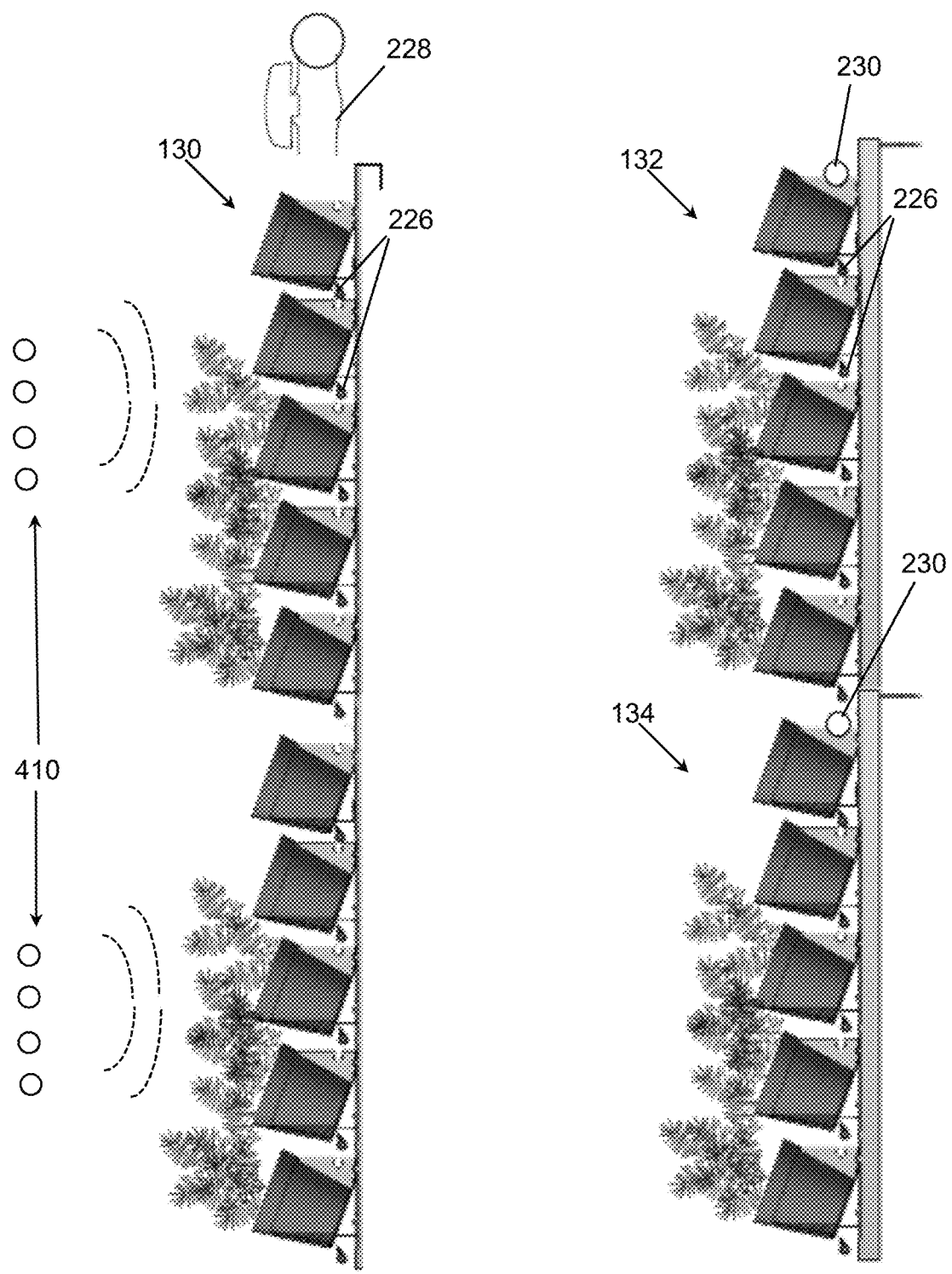

In the example embodiment of FIG. 22 the addition of an irrigation source 228 demonstrates the single supply of irrigation fluid (e.g., water, liquid nutrients, etc.) via the top trough. It will be further appreciated that control of irrigation source 228 may be manual or may be automated based upon or under the control of an irrigation system that not only controls flow of liquid, but further senses and/or monitors the level of liquid or soil moisture content in one or more of the troughs. As noted previously, each trough has a pre-calculated reservoir for water based upon the size of the trough as determined by the number and size of the potted plant(s) therein. Once the irrigation reaches the apertures in the trough excess irrigation drips to the trough below and so on until the panel assembly reaches full saturation. Thus, the depicted assembly includes a source of irrigation liquid operatively associated with at least an uppermost trough. Not only does the irrigation system include a source of liquid, as well as a trough, drip pan, drip line 230 or a similar fluid delivery system employed to provide liquid to one or more of the troughs. As seen in the wall-mount panel assemblies 132 and 134 in FIG. 23, the introduction of irrigation through multiple drip lines 230 throughout the panel assembly is also contemplated. As described above, once the irrigation liquid level reaches the apertures in a trough excess irrigation liquid drips to the trough below and so on until the panel assembly reaches full saturation.

Figure 24:
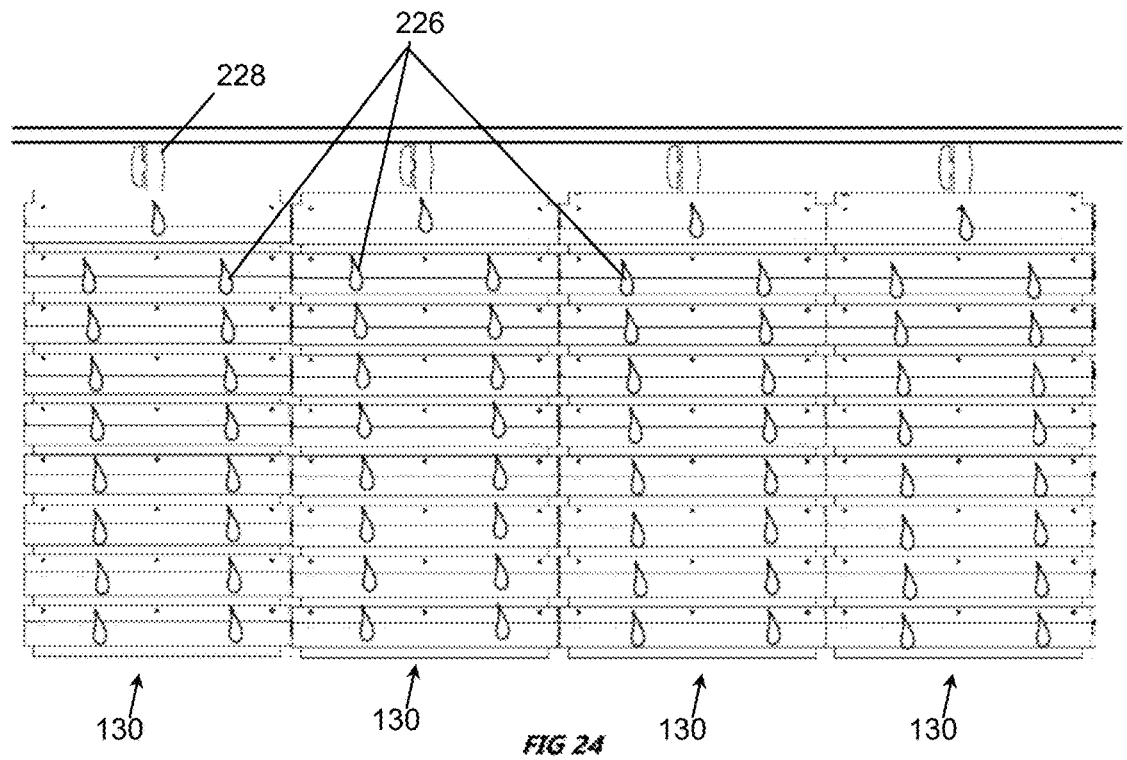
FIGS. 24-25 is a schematic view showing the flow within FIGS. 20-23.
Figure 25:
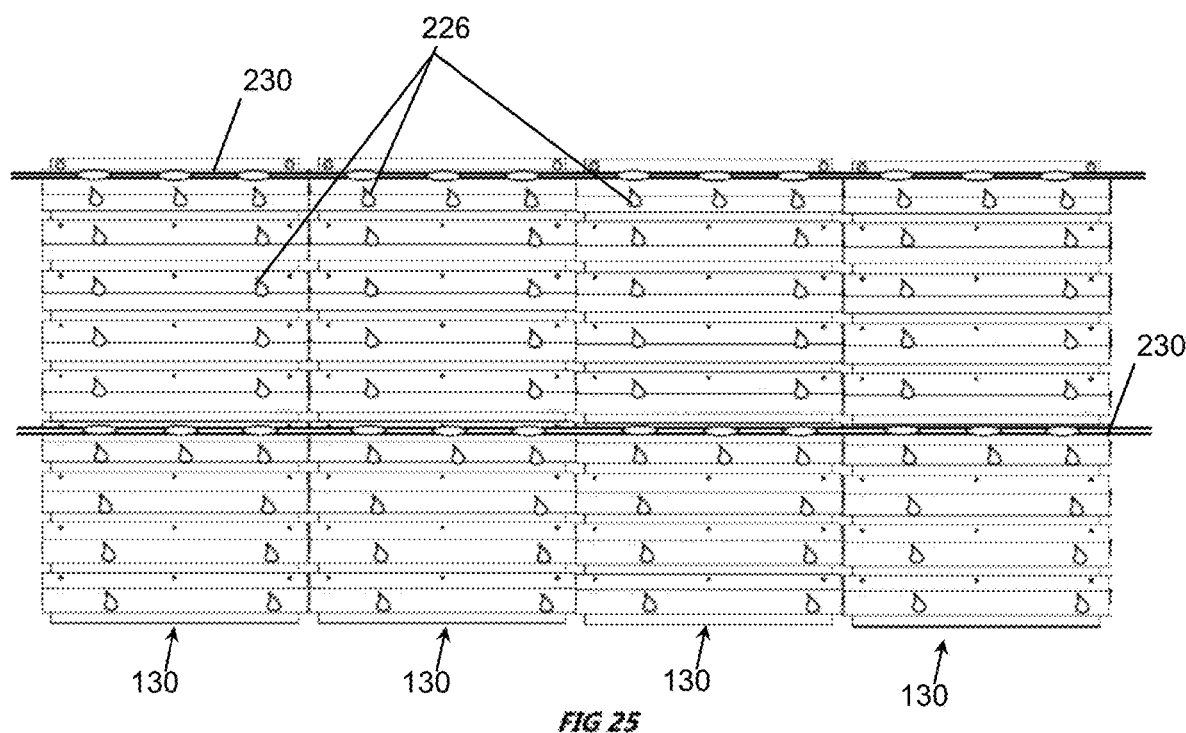

FIGS. 24-25 respectively depict the front views of the examples found in FIGS. 22 and 23, where each shows the introduction of irrigation. In FIG. 24 the source is a supply applied to the top trough, and in FIG. 25 a pair of drip lines 230 are provided. As will be appreciated, the lowermost drip line 230 in FIG. 25 may be redundant or may assist in irrigation for a crop that requires considerable irrigation. Also contemplated in a multi-panel system as depicted in FIGS. 24 and 25 are interlocking features along at least one edge least of the backplanes such that the interlocking features of adjacent or abutting backplanes interlock or mate with one another. Such a feature may also include a seal or gasket so as to present an impervious barrier between the backplanes.

Figure 26:
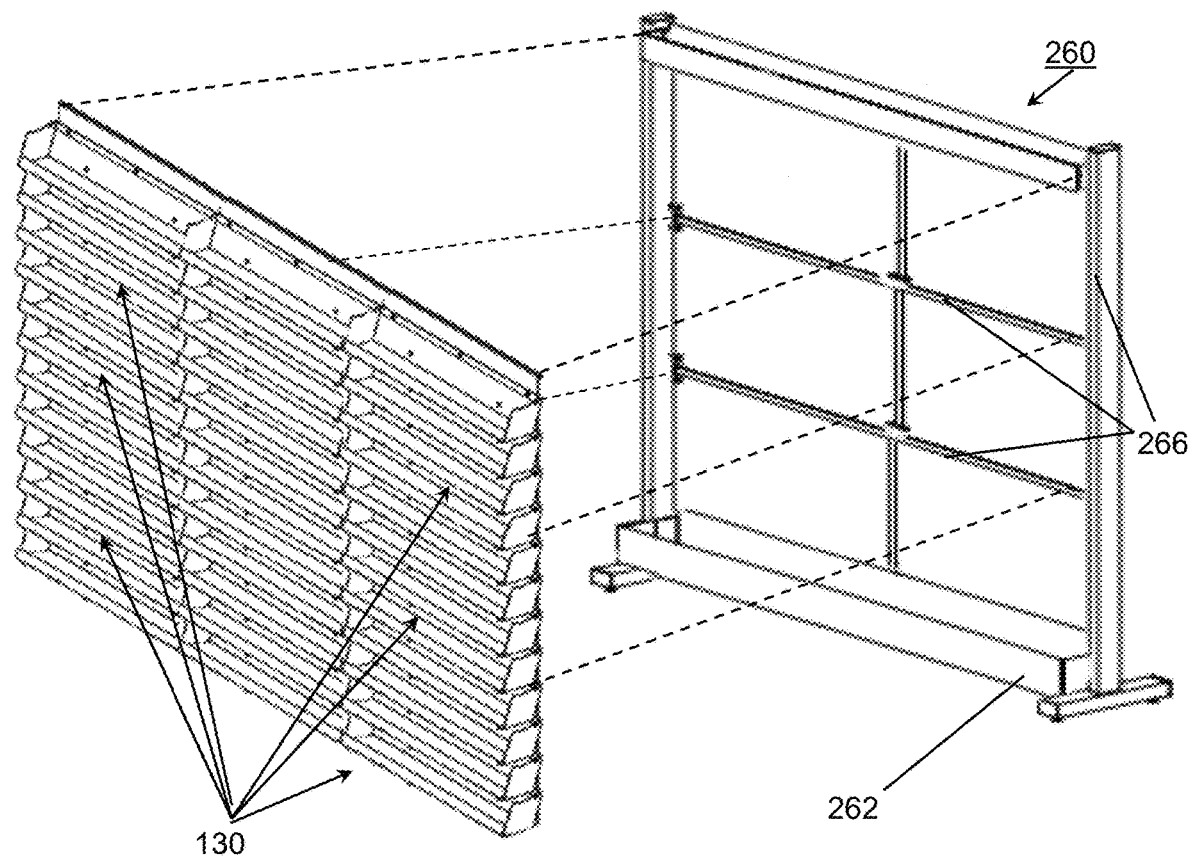
FIG. 26 is an assembly view showing a freestanding framework.

Turning to FIG. 26, depicted therein is a perspective view of a movable rack 260 for the support of a series of panels 130. In the illustrated embodiment, panels 130 are of the type that include a hook located at the upper most part of the backplane for mounting (e.g., hanging) from a bracket system which is provided by the freestanding armature or framework 266 of rack 260. Each of the panels 130 may be hung from the framework, and thereby maintained in a generally vertical position. The use of racks 260 allow for the hanging of panels 130 on one or both sides, and the racks may be further placed adjacent one another to create rows of racks as well. As will be appreciated, supplemental lighting (e.g., 410 in FIG. 22) may be used, between the rows or racks of vertical panels 130 in order to assure adequate light exposure is provided for the vegetative growth supported in the racks and troughs.

Figure 27:
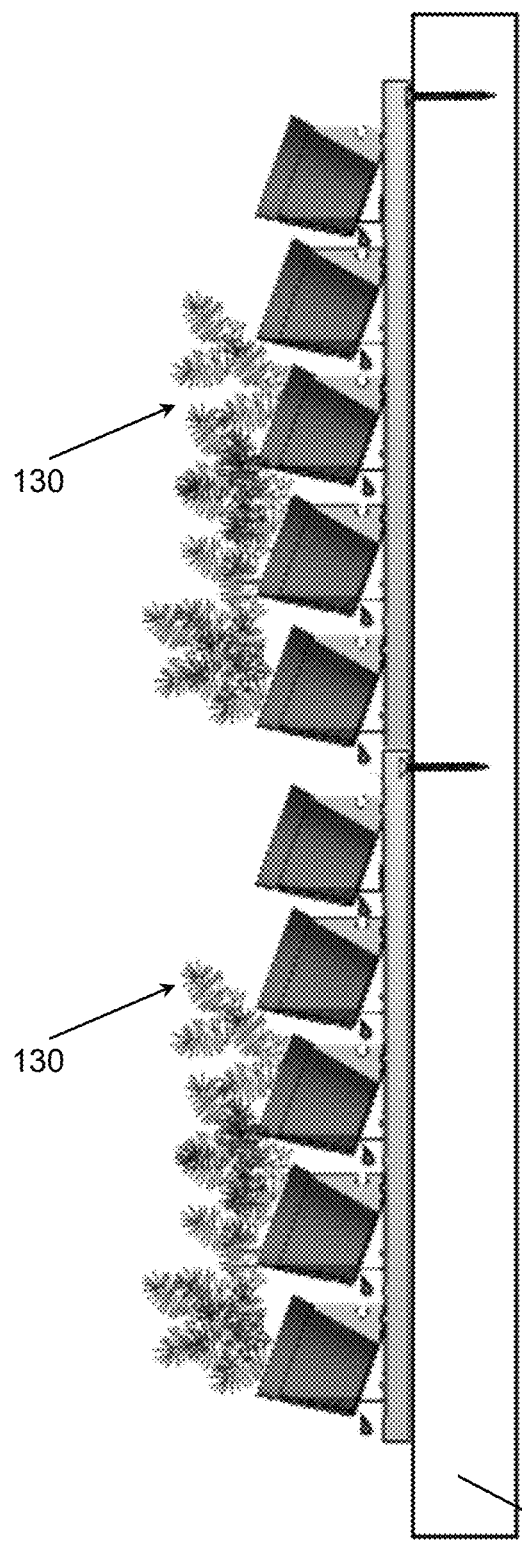
FIGS. 27-29 a vertical wall showing various backplane mounting.
Figure 28:
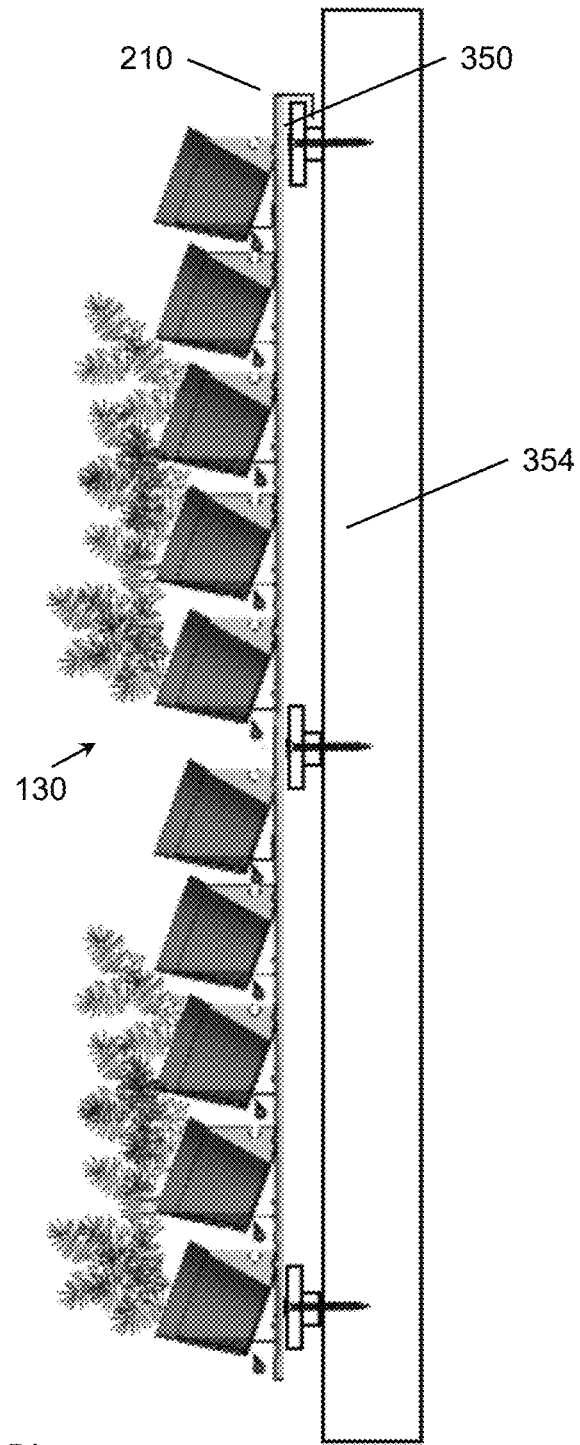
Figure 29:
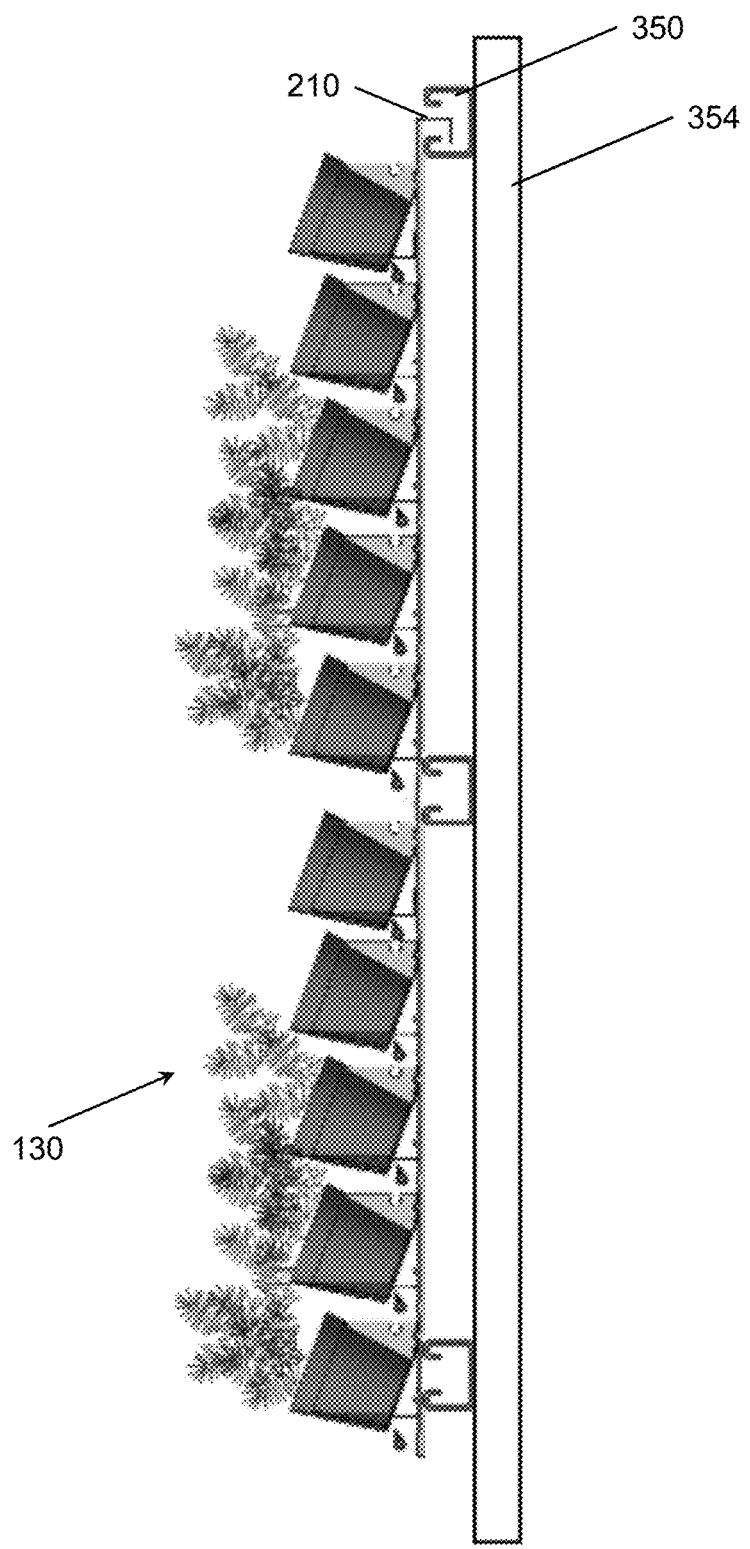

FIGS. 27-29 are side views of panels 130 mounted to a vertical wall 354. FIGS. 28 and 29, in particular, illustrate the hook-type panel mounting system, with brackets 350 mounted to the wall and the panels 130 then hung thereon. And, in FIG. 29, the brackets 350 may be provided using a conventional strut channel system.

Figure 30:
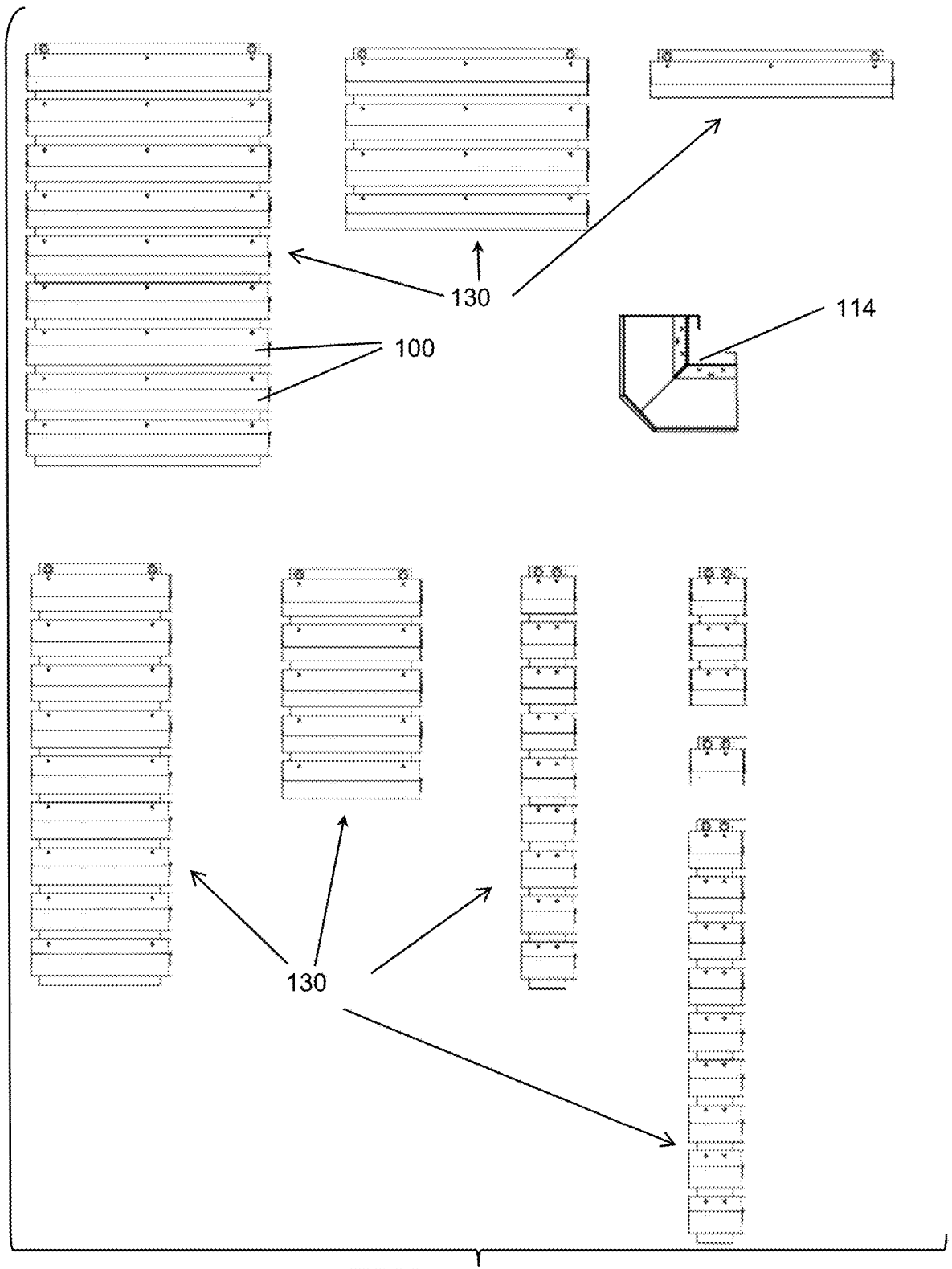
FIG. 30 shows variations of the backplane.
Figure 31:
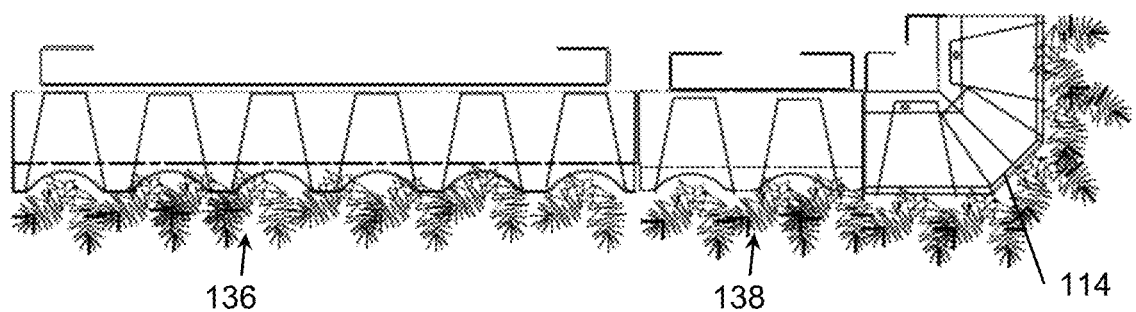
FIG. 31 is a top down view of a corner trough in combination with FIG. 22.
Figure 32:
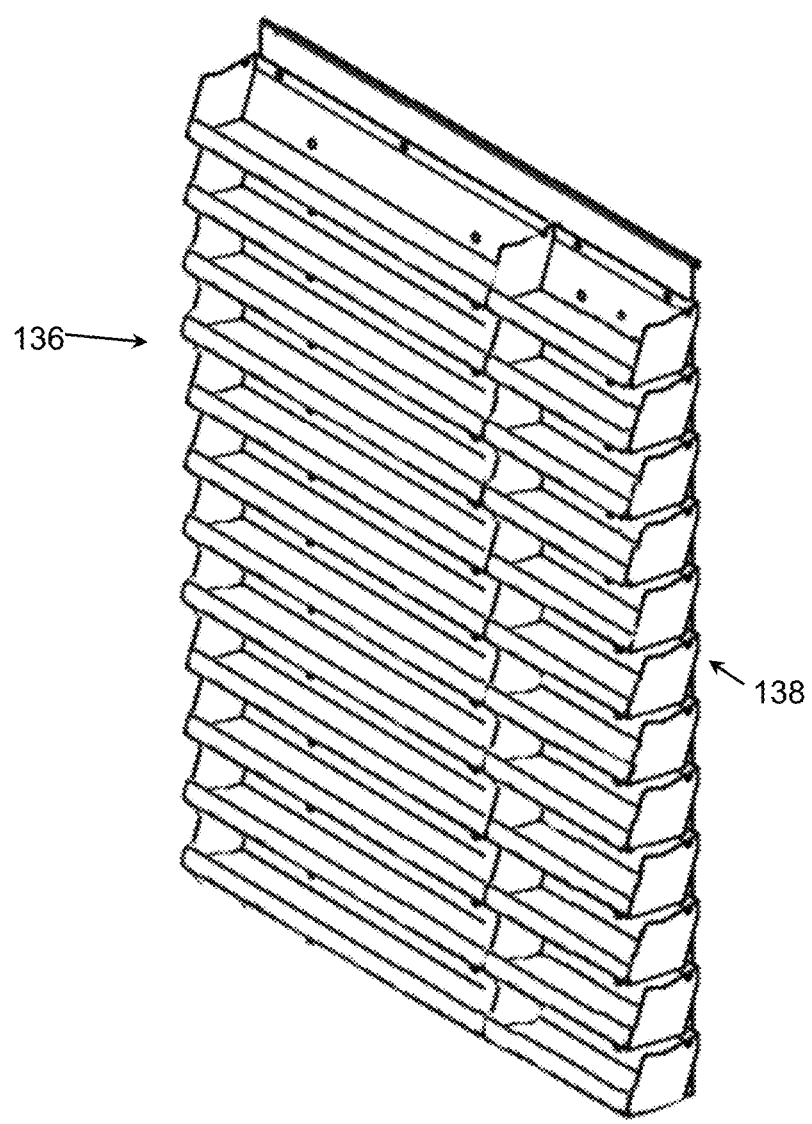
FIG. 32 is a trough stack with a six/two pot combination.
Figure 33:
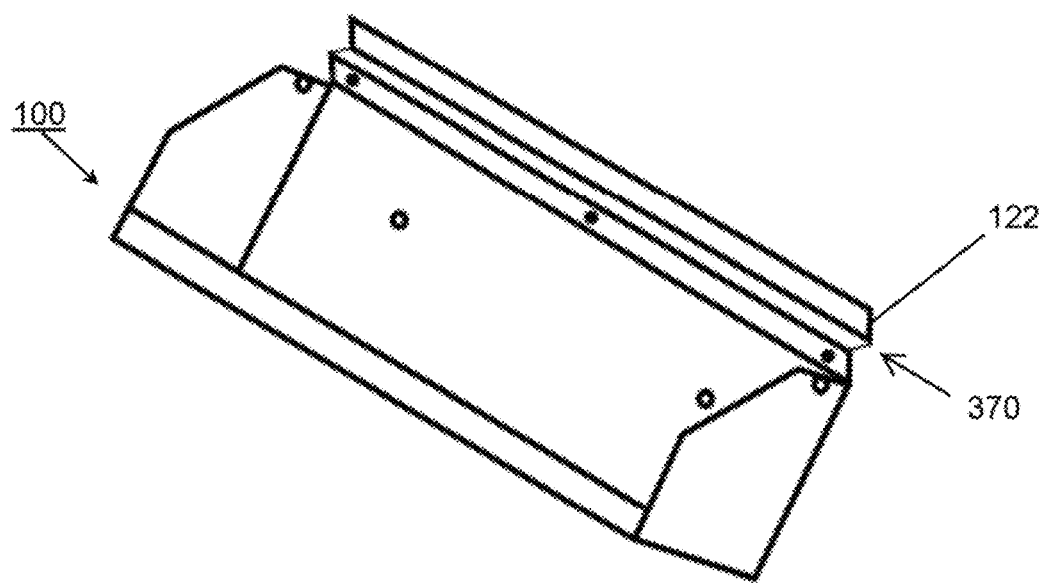
Figure 34:
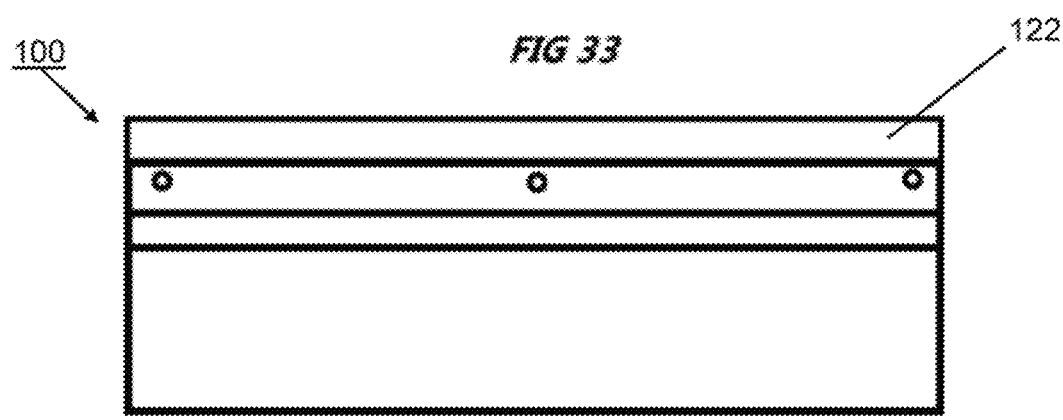

Turning next to FIGS. 30-32, depicted therein are various illustrations to illustrate the different sizes and configurations of panels 130 (and associated troughs 100) that may be employed in the disclosed system, including corner troughs 114, which are designed to traverse a right-angle vertical corner. Once again, all troughs may be sized to fit the desired quantity and size of the potted plants that are supported in the troughs 100. FIG. 31 provides a top plan view of a panel 136 having a plurality of a six-pot troughs with one being adjacent to a panel 138 with two-pot troughs, and adjacent to a further corner trough piece 114. Lastly, FIG. 32 is a perspective view of a panel 136 having plurality of a six-pot troughs adjacent to panel 138 with two-pot troughs.

Considering FIGS. 33-38, depicted therein are various views that illustrate an alternative, tab-and-slot attachment mechanism suitable for attaching the troughs 100 to the backplanes 200. In the depicted embodiment, the angled tab of each trough is further extended and includes two additional longitudinal brakes that provide a jog 370 in the tab 122. Once the broken tab 122 is inserted into the slot 380 in backplane 200, the trough may then be supported by the jog in the tab resting within the slot. While it may be possible to use additional fasteners, the tabs themselves may be suitable to support the weight of the fully-loaded (and irrigated) troughs. Moreover, the tabs may or may not extend the entire length of the slot, and multiple tabs and slots may be used for each trough.

Having described the general components of several assemblies for supporting vegetative growth, attention is now turned to further description of several features of the vertical agriculture systems. As noted, the system generally employ arrays of longitudinal troughs 100 attached to one or more backplanes 200 to form a panel 130. One feature of the assemblies as described is that the backplane has a generally impervious front surface, and irrigation provided via the troughs does not penetrate the backplane so that any supporting wall or structure is not affected by the irrigation. Moreover, the basic design accounts for the vertical planting, retaining, watering, and fertilizing of vegetation for both commercial and domestic horticulture and decorative applications.

The size and number of individual potted plants determine the dimensions of troughs 100, whereas the number of troughs 100 that are on a backplane determines the height of finished panel. Therefore the assembly of the numerous troughs 100 onto the backplane makes up panel assembly 130, as shown in FIG. 13, in order to sustain the growth of vegetation in substantially a vertical plane. Panel assemblies 130 are mounted adjacent and in combination with one another to form a complete wall of plantings with no encumbrances due to size limitations of the panel assembly. The complete panel assembly 130 includes a backplane 200 and an array of attached troughs 100 mounted in such a manner as to incline away from the backplane at an angle in the range of about 5 to 60 degrees, as seen in FIGS. 13 and 14 for example.

Figure 15:
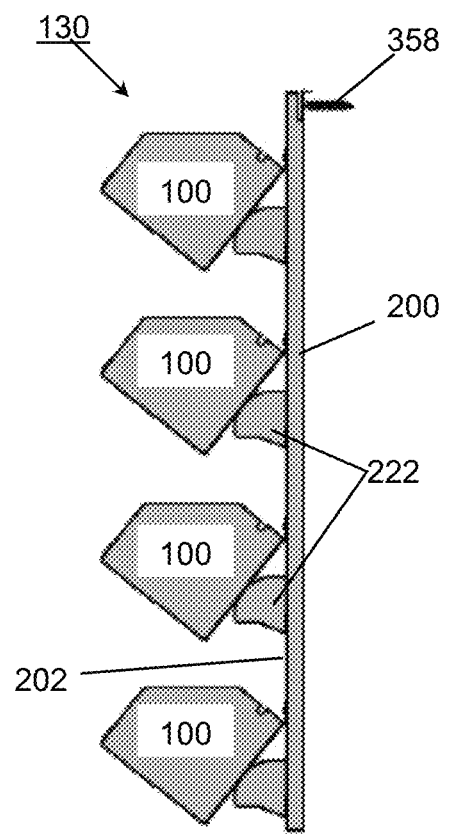
Figure 16:
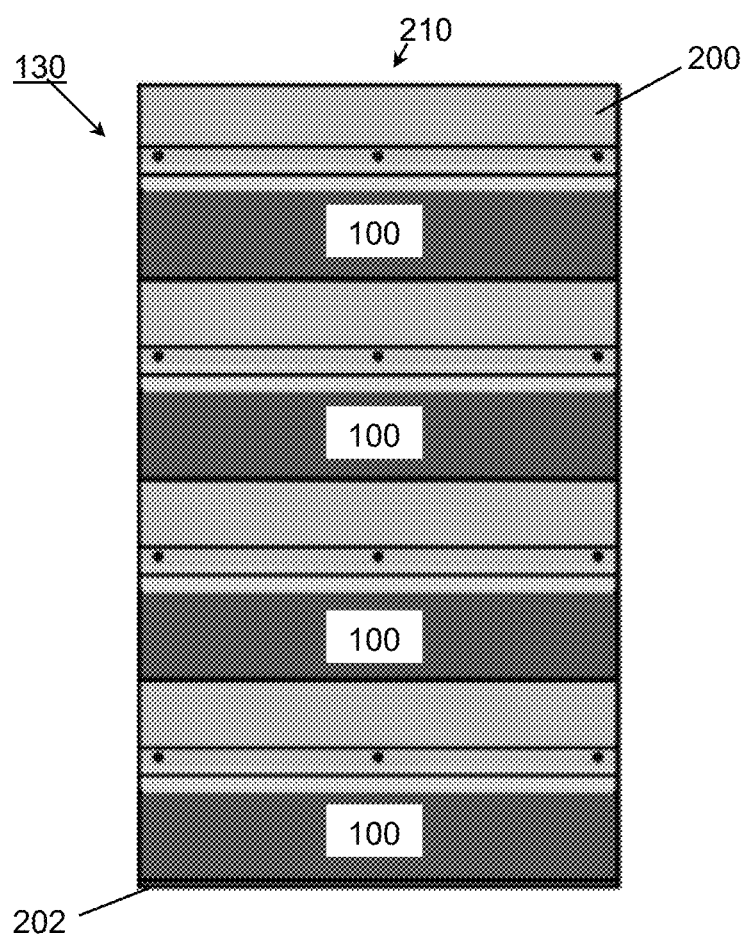
FIGS. 16-17 is a front view of multi-troughs having a mounting system.
Figure 17:
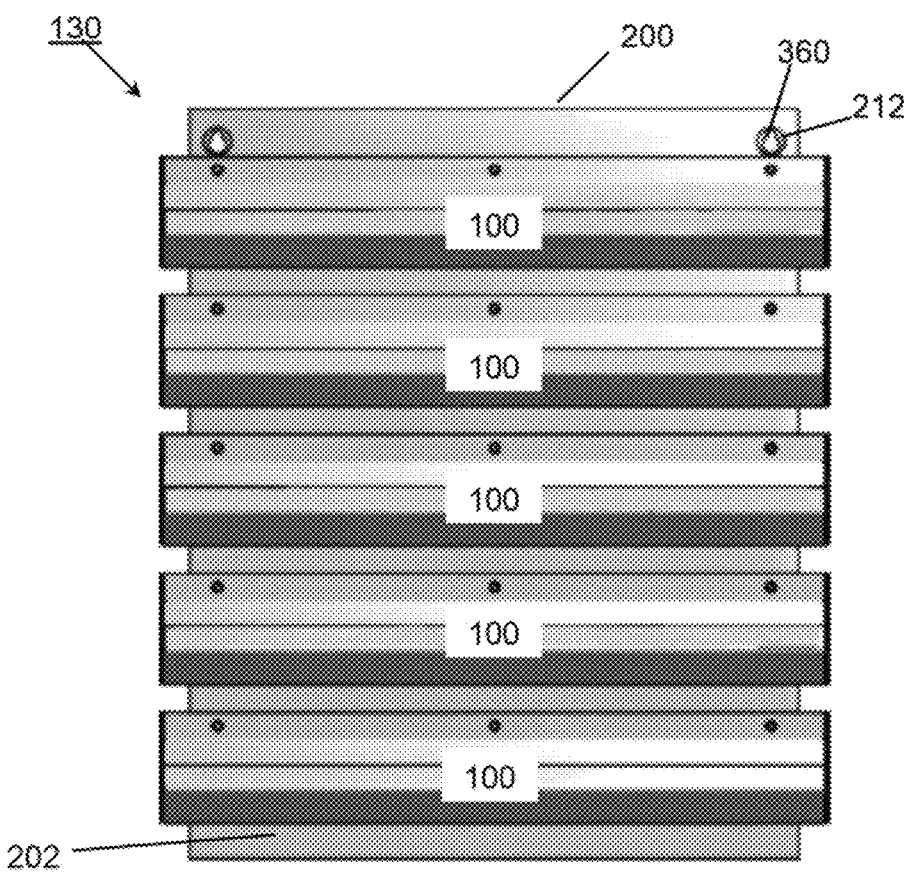

Panel assembly 130, for example in FIG. 8, includes a backplane 200 having a upper edge that has two 90-degree bends in series along the entire length, thereby forming a hook to hang on a freestanding supporting bracket or a structure such as a moveable rack 260, as shown in FIG. 26. In the alternative backplane 200 can be mounted to a wall with various hardware, as seen in FIGS. 9 and 11, where an aperture 212 allows for the insertion of fastener 358, such as a toggle bolt or expansion receptacle for a hollow wall, or a Tapcon®, lag bolt or Hilti® anchors for a solid wall. Notably in the direct wall-mount panels, backplane 200 includes a flange 216 having two adjacent 90 degree bends along the vertical sides to form a standoff that separates the backplane from the wall structure, as well as adding rigidity to the panel assembly. Panels may consist of any number of troughs and may be designed as predefined sizes (a selected number of troughs of predetermined width) or as custom panels intended for a particular setting. In summary, panels 130 are intended to attach to a vertical or inclined structure by one of at least two methods; (i) conventional fasteners, or (ii) a formed bracket along the top of the backplane. When conventional fasteners are used a keyhole slot 360 is provided so the panel (keyhole) can be placed over the protruding head of the fastener, which is either a screw or a nail, as shown in FIGS. 13 and 15.

Turning to FIGS. 20-23 and FIGS. 27-29 troughs 100 are engaged within either backplane 200 having at least one aperture 104 strategically positioned along the rear surface to allow for the transfer of a fluid from one trough to another lower trough. This arrangement provides for water to cascade from one trough down to another as water fills a trough up to aperture 104. As seen in FIG. 22 the fluid flows from trough to trough. The specific position (height) of the aperture provides a regulatory control for the volume of water allowed to be retained in a trough, and to precipitate from trough to through. Gravitational water transfer from trough to trough, as well as to lower panels, is accomplished with no additional hardware or plumbing as the water flows in sequence beginning with the source at faucet 228 into the upper most trough, to a lower adjacent trough through apertures 104. Additionally, depending upon the size of the potted plants, the angle of the trough further allows for the control of the amount of fluid retained and allowed to transfer from one trough to another. The size of the nursery pot, the aperture position and size is determined to prevent over watering, by allowing for fluid transfer from trough to trough. Moreover, permeable pots, or openings located within the pots, allow for the planting mix or material and the plant to uptake a specific amount of water (or nutrient) through a wicking process. Thus the angle of the trough, and aperture size/location there is a calculated reservoir capacity predicated on (i) nursery pot size, (ii) soil type and (iii) plant requirements.

It is further anticipated that trough 100 may be secured nearly flat against backplane, 200, so the plants extend in a more upward direction. When troughs 100 are secured to the backplane 200 they will accommodate nursery pots of varying sizes, e.g., 4.5" in diameter and up to 1.5 gallons in size.

Figures 20, 21:
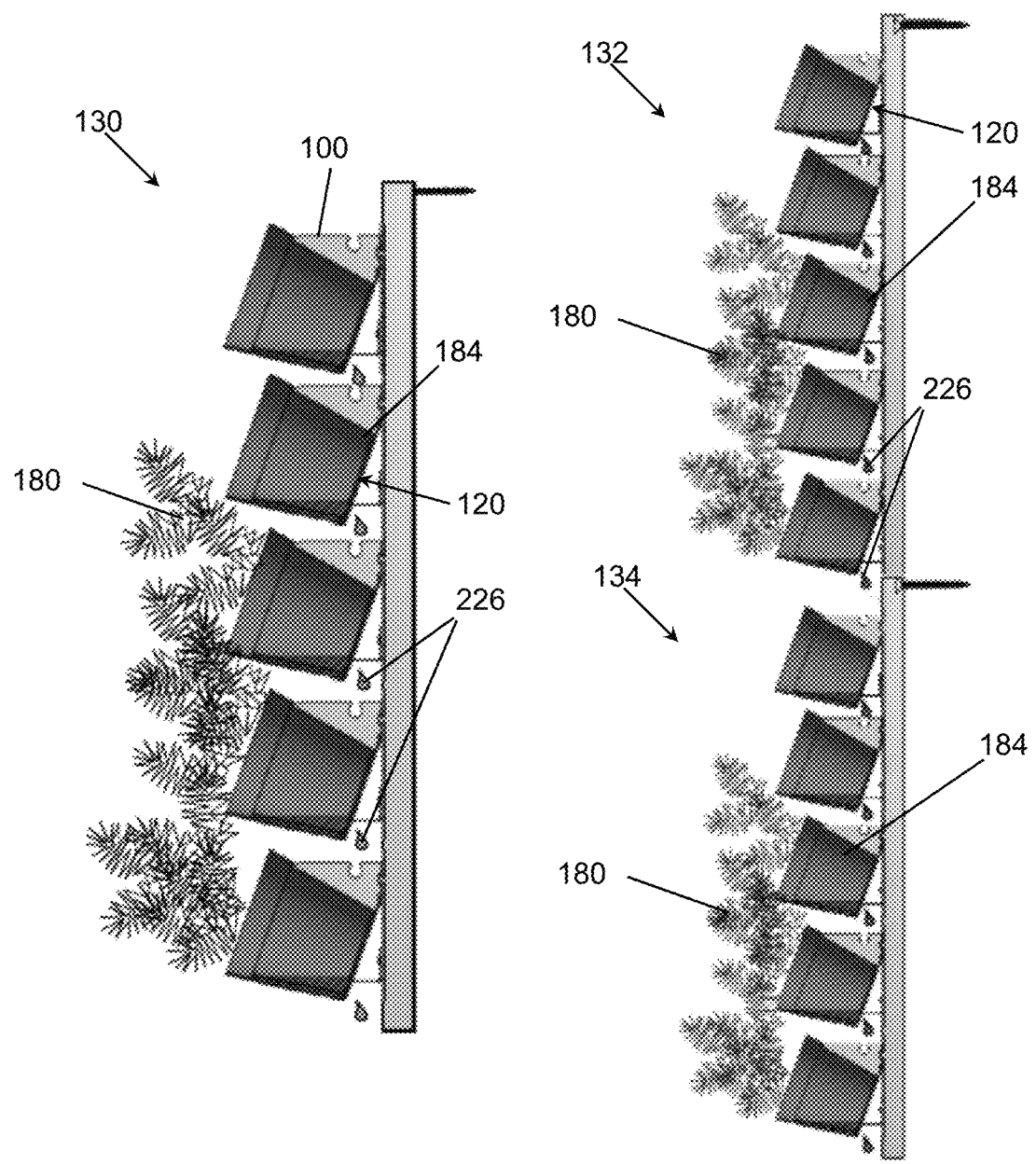
FIGS. 20-23 is a right side view showing the irrigation migration.

The disclosed embodiments, having horizontal rows in a vertically oriented position, provides for the fluid connectivity of troughs 100, when mounted into a panel assembly as seen in FIGS. 20-21. Notably troughs 100 also include an overflow control feature whereby at least one notch 102, located on one or both side walls of the trough 100, provides for excess water to be drained from the trough. Additionally the bottom of a panel assembly 130 or supporting structure such as a rack, may include a catch basin 262, as best seen in FIG. 26. The catch basin 262 collects the excess liquid from the plant troughs above and passes it into a drain, or in the alternative collects the liquid for recycling or for further watering.

Now in regard to the mounting of troughs 100 to a backplane. The troughs have at least two means to be secured to the backplane, in FIG. 8 fasteners are shown and in FIG. 33 a hook and slot method is disclosed. In regard to fasteners, trough 100 includes a formed tab 122, as seen in FIG. 1, which extends upward from the rear of the trough and is bent forward at an oblique angle. Tab 122 includes at least two mounting holes 106 which are in alignment with complimentary holes 108 placed within the backplane 200. Once secured to the backplane with conventional fasteners (i.e. nut/bolt, rivets, sheet metal screws, threaded stud, captive T-nut® etc.) the trough angular position to the backplane is pre-determined by the angle of tab 122 and/or the supports 222. As previously discussed, the angle, in conjunction with the height of the apertures 104, provides for the proper volume of liquid to be retained in the trough, as well as clearance for the plants to grow beyond the trough above.

Figure 35:
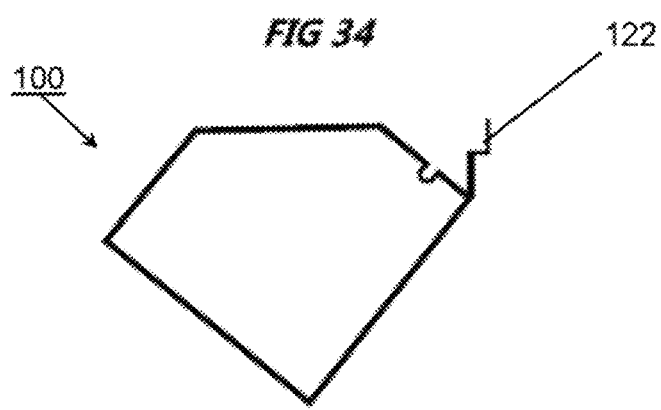
Figure 36:
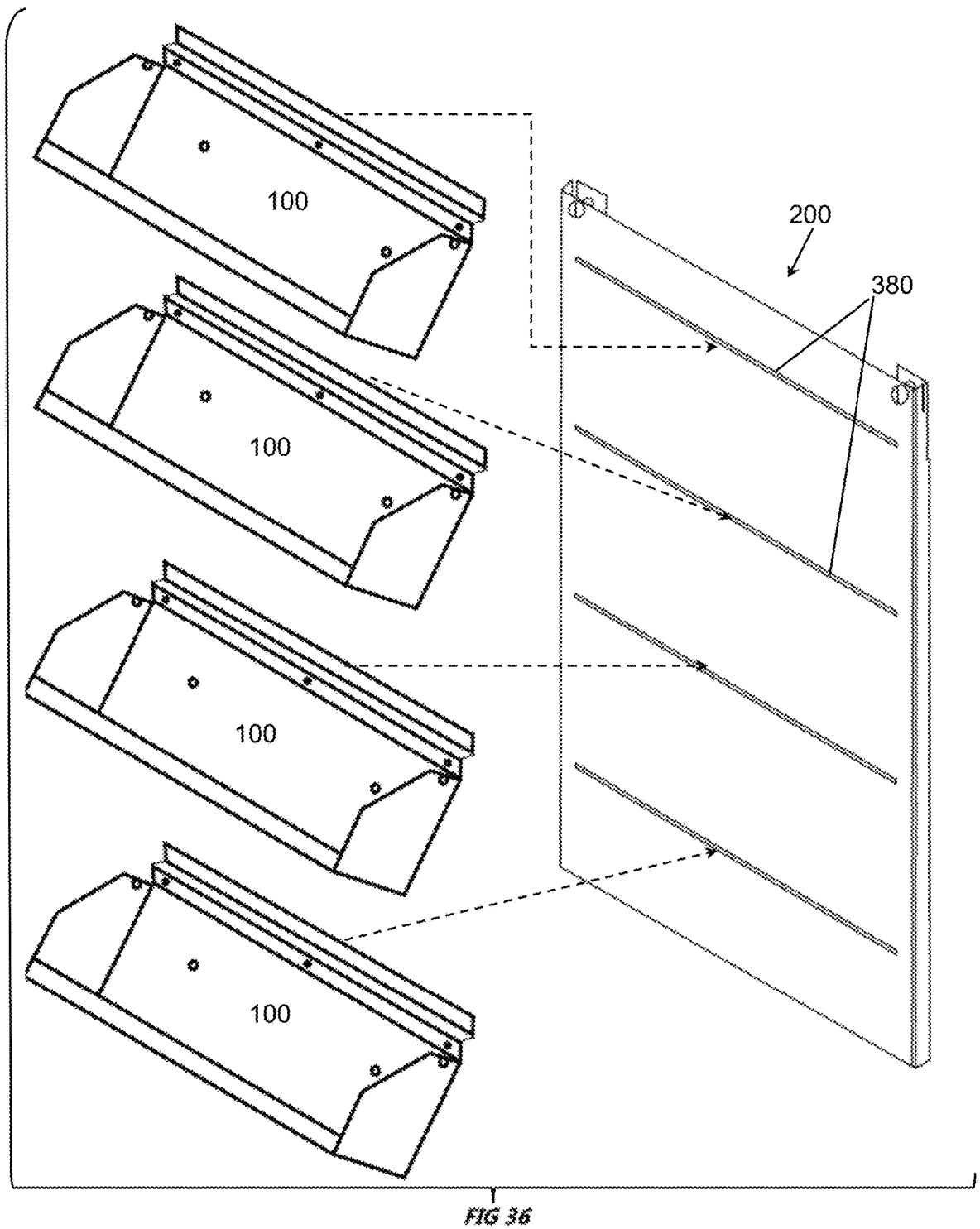

The alternative tab-and-slot means for mounting the troughs might not only eliminate the need for fastening hardware but provide for the installation and removal of troughs without the need for tools. This is advantages to enable the re-arranging of troughs and plants, to optimize uniform growth and interchange arrangements. The basic concept of the tab-and-slot mounting technique, as depicted in the embodiments of FIGS. 33-38, includes a jog or "Z" type bend in tab 122, which creates a hook like member to be inserted into the corresponding slot 380 within backplane 200. As seen in FIG. 35, in view of FIG. 33, tab 122 of the trough retains the oblique bend of the previous mounting method, but the tab now also includes two opposing right angle bends which produce a step within tab 122. FIGS. 37-38 illustrate the manner in which the aforementioned "Z" step in tab 122 becomes interconnected within slots 380 of backplane 200. As seen, tab 122 of trough 100 is firmly engaged within the backplane slot 380 and can only be disengaged when the trough is rotated upwardly to remove the jog or Z bend from the slot.

In the case where tab 122 is insufficient to reliably hold the trough bottom away from the backplane, support 222 may be used as described above. Support 222 can be constructed from any non-compressible material that is not adversely affected by moisture. Support 222 can be affixed to either the backplane or the trough via fasteners or an adhesive. Panels, such as 130 in FIG. 13, consist of at least two generally parallel troughs attached to a backplane, and as will be appreciated various panel sizes and dimensions may be constructed.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. An assembly for supporting vegetative growth in a generally vertical orientation, comprising:
   (a) a backplane including a planar front surface consisting essentially of a fluid-impervious material; and
   (b) an array of troughs attached on the planar front surface of the backplane, each of said troughs suitable for supporting the vegetative growth of a plurality of plants disposed therein, wherein each of said troughs includes an adjoining planar bottom and planar back, and a pair of sides, each side extending from an end of the back along the end of the bottom, a front wall spanning between the sides along a longitudinal edge of the bottom, and at least one angled tab extending upward from and along an entire longitudinal edge of the back, and at an oblique angle relative to the back, and wherein the at least one angled tab extending upward from and along an entire longitudinal edge of the back further includes two opposing right angle bends that produce a step within the angled tab,
   wherein when attached on the planar front surface of the backplane the combination of the troughs and backplane provide a substantially fluid impervious backplane such that irrigation applied to the vegetative growth cannot penetrate to a rear surface of the backplane.

2. The assembly of claim 1, wherein the plurality of plants are each disposed in a pot, said pot being maintained in contact with at least one surface of one of said troughs.

3. The assembly according to claim 1, wherein the backplane abuts an adjoining backplane.

4. The assembly according to claim 1, wherein each of said troughs includes at least one aperture to limit a fluid level within the trough and to permit the transfer of fluid to a lower trough.

5. The assembly according to claim 1, wherein each of said troughs includes at least one aperture to permit the transfer of a fluid from one trough to another trough below.

6. The assembly according to claim 1, further including a source of irrigation liquid operatively associated with at least an uppermost trough.

\* \* \* \* \*